(12) United States Patent  (10) Patent No.: US 11,948,530 B2
Zhang et al.  (45) Date of Patent: Apr. 2, 2024

(54) COMPUTER-IMPLEMENTED METHOD FOR GENERATING GRADIENT COLOR VALUE ARRAY, APPARATUS, AND COMPUTER-PROGRAM PRODUCT THEREOF

(71) Applicant: BOE Technology Group Co., Ltd., Beijing (CN)

(72) Inventors: Zhe Zhang, Beijing (CN); Yingjie Li, Beijing (CN); Linyi Fan, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 317 days.

(21) Appl. No.: 17/419,671

(22) PCT Filed: Feb. 26, 2020

(86) PCT No.: PCT/CN2020/076716
§ 371 (c)(1),
(2) Date: Jun. 29, 2021

(87) PCT Pub. No.: WO2021/168675
PCT Pub. Date: Sep. 2, 2021

(65) Prior Publication Data
US 2022/0319465 A1  Oct. 6, 2022

(51) Int. Cl.
*G09G 5/02* (2006.01)

(52) U.S. Cl.
CPC .......... *G09G 5/024* (2013.01); *G09G 2354/00* (2013.01)

(58) Field of Classification Search
None
See application file for complete search history.

(56) References Cited

U.S. PATENT DOCUMENTS

2016/0246475 A1*  8/2016  Garcia .................. G06T 11/001

* cited by examiner

*Primary Examiner* — Roy P Rabindranath
(74) *Attorney, Agent, or Firm* — Intellectual Valley Law, P.C.

(57) ABSTRACT

A computer-implemented method is provided. The method includes obtaining a first value of a first color setting of an operating system; obtaining a second value of a second color setting of an application on the operating system; and resetting the second color setting of the application to a third color setting based on a combination of the first value and the second value. The third color setting is different from the first color setting, and the third color setting is different from the second color setting.

19 Claims, 9 Drawing Sheets a national stage application under 35 U.S.C. § 371 of International Application No. PCT/CN2020/076716, filed Feb. 26, 2020, the contents of which are incorporated by reference in the entirety.

COMPUTER-IMPLEMENTED METHOD FOR GENERATING GRADIENT COLOR VALUE ARRAY, APPARATUS, AND COMPUTER-PROGRAM PRODUCT THEREOF

CROSS-REFERENCE TO RELATED APPLICATION

This application is a national stage application under 35 U.S.C. § 371 of International Application No. PCT/CN2020/076716, filed Feb. 26, 2020, the contents of which are incorporated by reference in the entirety.

TECHNICAL FIELD

The present invention relates to display technology, more particularly, to a computer-implemented method, an apparatus, and a computer-program product.

BACKGROUND

Electronic devices such as computers include operating systems that have user interfaces displayable to users. Applications that run on an operating system also have application user interfaces displayable to users. The user interfaces of the operating systems typically include design elements that have been preset. Similarly, the user interfaces of the applications running on the operating system also have certain design elements that have been preset. These preset design elements typically have preset color settings.

SUMMARY

In one aspect, the present disclosure provides a computer-implemented method, the method comprising obtaining a first value of a first color setting of an operating system; obtaining a second value of a second color setting of an application on the operating system; and resetting the second color setting of the application to a third color setting based on a combination of the first value and the second value; wherein the third color setting is different from the first color setting, and the third color setting is different from the second color setting.

Optionally, the third color setting is determined based on a bias factor, the first value, and the second value; and a value of the bias factor determines whether the third color setting is biased toward the first value or toward the second value.

Optionally, the computer-implemented method further comprising adjusting the bias factor to bias a third value of the third color setting toward one of the first value and the second value.

Optionally, the computer-implemented method further comprising generating an adjustment bar on a user interface allowing a user to adjust the bias factor.

Optionally, the computer-implemented method further comprising generating a gradient color value array based on a combination of the first value; the second value; and a total number of sampling points in a color space containing points corresponding to the first value and the second value.

Optionally, generating the gradient color value array comprises determining the total number of sampling points in the color space containing points corresponding to the first value and the second value; determining a reference point dividing the color space into a first color space and a second color space, the reference point being between a first point corresponding to the first value and a second point corresponding to the second value; determining a first sampling interval with respect to a first sub-set of sampling points in the first color space and a second sampling interval with respect to a second sub-set of sampling points in the second color space; sampling the first color space respectively at first type sampling points in the first sub-set of sampling points, adjacent first type sampling points spaced apart by the first sampling interval; sampling the second color space respectively at second type sampling points in the second sub-set of sampling points, adjacent second type sampling points spaced apart by the second sampling interval; generating a first gradient color value sub-array comprising values respectively from the first type sampling points; and generating a second gradient color value sub-array comprising values respectively from the second type sampling points; wherein the gradient color value array comprises the first gradient color value sub-array and the second gradient color value sub-array.

Optionally, the bias factor has a value selected from a range between a first limit value and a second limit value; wherein, when the bias factor is adjusted closer to the first limit value than to the second limit value, the first sampling interval is smaller than the second sampling interval; and when the bias factor is adjusted closer to the second limit value than to the first limit value, the first sampling interval is greater than the second sampling interval.

Optionally, the third color setting is determined based on the bias factor, the first value, and the second value; and wherein the reference point corresponds to an n-th sampling point of N number of sampling points, wherein $0<n<N$; N is the total number of sampling points, n is an integer closest to a value obtained by multiplying the bias factor by the total number of sampling points in the color space containing a first point corresponding to the first value and a second point corresponding to the second value.

Optionally, the first sampling interval is determined according to Equation (1): $I1=(V2-V1)*B/(N*(1-B))$; wherein I1 stands for the first sampling interval; V2 stands for the second value; V1 represents the first value; B stands for the bias factor; and N stands for the total number of sampling points; a value of an i-th sampling point within the first sub-set of sampling points is determined according to Equation (2): $Vi=V1+I1*i$; wherein Vi stands for the value of the i-th sampling point among the N number of sampling points; V1 stands for the first value; i is an integer; and $0 \le i < n$; the second sampling interval is determined according to Equation (3): $I2=(V2-V1)*(1-B)/*B))$; wherein I2 represents the second sampling interval; V2 represents the second value; V1 represents the first value; B represents the bias factor; and N represents the total number of sampling points; and a value of a j-th sampling point within the second sub-set of sampling points is determined according to Equation (4): $Vj=V1+I1*n+I2*(j-n)$; wherein Vj stands for the value of the j-th sampling point among the N number of sampling points; V1 stands for the first value; I1 stands for the first sampling interval; I2 stands for the second sampling interval; j is an integer; and $n \le j < N$.

Optionally, the computer-implemented method further comprising separating the color space into a plurality of color channels; wherein, in a respective color channel, generating the gradient color value array comprises determining the total number of sampling points in the respective color channel containing points corresponding to a first channel value and a second channel value, wherein the first channel value is a value of a color setting of an operating system with respect to the respective color channel, and the second channel value is a value of a default color setting of an application on the operating system with respect to the respective color channel; determining a reference point dividing the color space into a first color space and a second color space, the reference point being between a first point corresponding to the first channel value and a second point corresponding to the second channel value; determining a first sampling interval with respect to a first sub-set of sampling points in the first color space and a second sampling interval with respect to a second sub-set of sampling points in the second color space; sampling the first color space respectively at first type sampling points in the first sub-set of sampling points, adjacent first type sampling points spaced apart by the first sampling interval; sampling the second color space respectively at second type sampling points in the second sub-set of sampling points, adjacent second type sampling points spaced apart by the second sampling interval; generating a first gradient color value sub-array comprising values respectively from the first type sampling points; and generating a second gradient color value sub-array comprising values respectively from the second type sampling points; wherein the gradient color value array comprises the first gradient color value sub-array and the second gradient color value sub-array.

Optionally, the computer-implemented method further comprising determining a third value of the third color setting by selecting a most representative color value in the gradient color value array.

Optionally, the computer-implemented method further comprising determining a third value of the third color setting by performing a median cut algorithm on the gradient color value array.

Optionally, performing the median cut algorithm on the gradient color value array comprises determining a smallest three-dimensional box within color space that contains all sampling points in the gradient color value array; and dividing the smallest three-dimensional box into a plurality of defined regions based on the median cut algorithm; wherein dividing the smallest three-dimensional box into the plurality of defined regions comprises sorting the sampling points within the smallest three-dimensional box along a longest axis of the smallest three-dimensional box; dividing the smallest three-dimensional box into two regions at a median of sorted sampling points; and applying sorting and dividing to the two regions until the smallest three-dimensional box has been divided into the plurality of defined regions.

Optionally, the computer-implemented method further comprises assigning one of the plurality of defined regions as a selected defined region; and selecting a most representative color value in the selected defined region as a third value of the third color setting.

Optionally, the most representative color value is a color value of a most representative sampling point; and a sum of Euclidean distances between the most representative sampling point and other sampling points in the selected defined region is less than any of corresponding sums of Euclidean distances for the other sampling points.

Optionally, the computer-implemented method further comprises converting the gradient color value array into a first image having a color gradient, the first image having a dimension substantially same as a second image in the application on the operating system; and replacing the second image in the application on the operating system with the first image.

Optionally, obtaining a first value of a first color setting of an operating system comprises detecting the operating system is running on a dark mode; obtaining a default color setting stored on the operating system; and reducing at least one of saturation or lightness of the default color setting to obtain the first value.

Optionally, the first color setting comprises one or more values selected from a group consisting of a value representing a first theme color of the operating system, a value representing a first accent color of the operating system, and a value representing a first text color of the operating system; the second color setting comprises one or more values selected from a group consisting of a value representing a second theme color of the application on the operating system, a value representing a second accent color, and a value representing a second text color; and the third color setting comprises one or more values selected from a group consisting of a value representing a third theme color, a value representing a third accent color, and a value representing a third text color.

Optionally, the first value is a value representing a first theme color of the operating system; the second value is a value representing a second theme color of the application on the operating system; the third value is a value representing a third theme color; and the third value is different from the first value, and the third value is different from the second value.

In another aspect, the present disclosure provides an apparatus, comprising a memory; one or more processors; wherein the memory and the one or more processors are connected with each other; and the memory stores computer-executable instructions for controlling the one or more processors to obtain a first value of a first color setting of an operating system; obtain a second value of a second color setting of an application on the operating system; and reset the second color setting of the application to a third color setting based on a combination of the first value and the second value; wherein the third color setting is different from the first color setting, and the third color setting is different from the second color setting.

In another aspect, the present disclosure provides a computer-program product comprising a non-transitory tangible computer-readable medium having computer-readable instructions thereon, the computer-readable instructions being executable by a processor to cause the processor to perform obtaining a first value of a first color setting of an operating system; obtaining a second value of a second color setting of an application on the operating system; and resetting the second color setting of the application to a third color setting based on a combination of the first value and the second value; wherein the third color setting is different from the first color setting, and the third color setting is different from the second color setting.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

Different applications might have different themes having different colors and styles, for example Facebook's default theme color is blue, and Instagram's default theme color is orange and purple. Also, the user interface of the electronic device has its own theme color, the theme color of the user interface of the electronic device may be different from the theme colors of various applications installed on the electronic device.

While using electronic devices, e.g. computers, mobile phones, and devices for video conference, people sometimes would like to customize the user interfaces (UI) of the electronic devices. For example, people can manually change themes of the user interface of an application installed in a mobile phone. People can also manually change themes of the user interface of the operating system of their mobile phone.

In one example, when the theme color of the user interface of the operating system of a mobile phone is green, the user of the mobile phone desires to have all the applications installed in the mobile phone to have a theme color similar to or consistent with the theme color of the operating system. The user has to manually adjust the theme color of each of the applications independently. The process is tedious and inflexible, as well as very time consuming.

In another example, an electronic device has a dark mode which can be automatically turned on when the electronic device detects that the ambient light is dim or the user is using the electronic device at night. When the dark mode is turned on, the brightness of the user interface of the operating system becomes lower to protect eyes of the user. However, not all the applications installed in the electronic device have a dark mode, therefore, it is desired to achieve a similar dark mode (e.g., lower brightness) effect on the applications, even though the applications themselves is not provided with a dark mode. The similar dark mode effect provides the user a consistent dark mode experience when switching between any application and the operating system, or switching among different applications. In related user interface, the user has to manually adjust the theme color of each of the applications independently. Again, the process is tedious and inflexible, as well as very time consuming.

Figure 1:
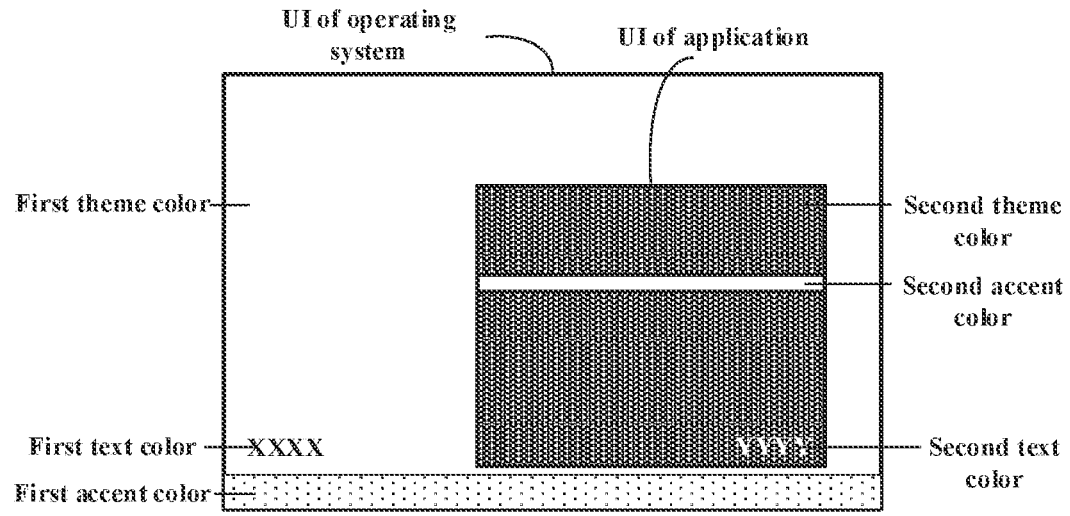
FIG. 1 is a schematic diagram of a user interface of an operation system and a user interface of an application in some embodiments according to the present disclosure.
Figure 2:
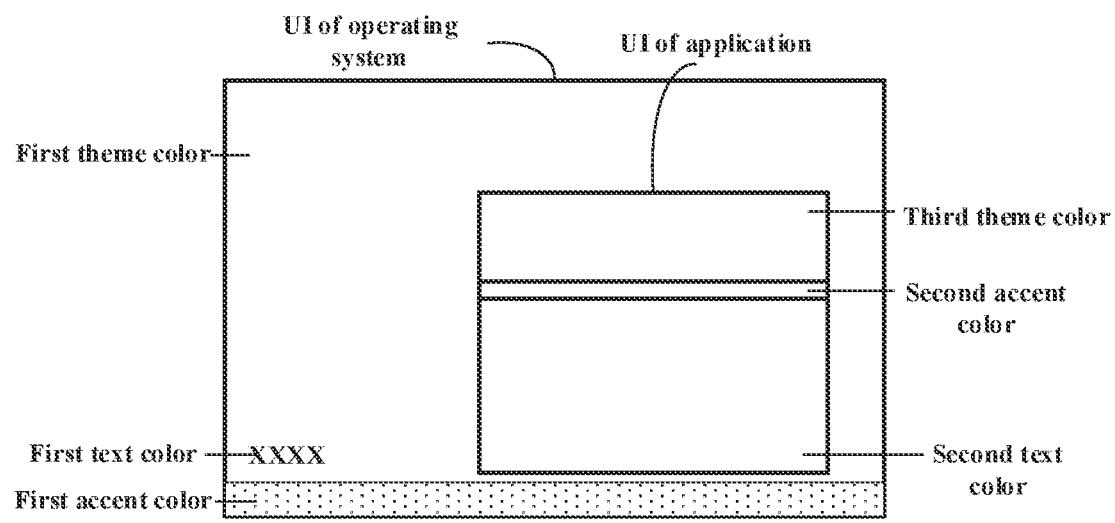
FIG. 2 is a schematic diagram of user interface of an operation system and a user interface of an application in some embodiments according to the present disclosure.

FIG. 1 is a schematic diagram of a user interface of an operation system and a user interface of an application in some embodiments according to the present disclosure. In some embodiments, referring to FIG. 1, the first theme color of the operating system is white, and the second theme color of the application is black. The second text color of the application is white. FIG. 2 is a schematic diagram of user interface of an operation system and a user interface of an application in some embodiments according to the present disclosure. Referring to FIG. 1 and FIG. 2, in a related user interface, in order for the application to have a theme color consistent with or substantially the same as the operating system, a simplistic approach may be implemented. In one example, the first theme color (e.g., white) of the operating system is obtained as a third theme color (e.g. white), and the third theme color (e.g., white) is used to reset the theme color of the application. Because the second text color remains unchanged, the third theme color (white) is the same as the second text color (also white). Subsequent to resetting the theme color of the application, the text of the application cannot be distinguished from the background on which the text of the application is located. It was discovered in the present disclosure, the overly simplistic approach described above often fail to achieve an ideal viewing experience.

Accordingly, the present disclosure provides, inter alia, a computer-implemented method, an apparatus, and computer-program product that substantially obviate one or more of the problems due to limitations and disadvantages of the related art. In one aspect, the present disclosure provides a computer-implemented method. Optionally, the computer-implemented method includes obtaining a first value of a first color setting of an operating system; obtaining a second value of a second color setting of an application on the operating system; and resetting the second color setting of the application to a third color setting based on a combination of the first value and the second value. Optionally, the third color setting is different from the first color setting, and the third color setting is different from the second color setting.

In the present disclosure, the third color setting is different from the first color setting of the operating system and the second color setting of the application, and is generated based on the first color setting of the operating system and the second color setting of the application. Not only that the third color setting can be distinguished from the first color setting and the second color setting, optionally it can also be flexibly adjusted to be biased towards one of the first color setting and the second color setting.

The term "operating system" as used herein in this application, is defined as an interface between hardware and user, which is responsible for the management and coordination of activities and the sharing of the resources of a computer, that acts as a host for computing applications running on the machine. One of the purposes of an operating system is to handle the resource allocation and access protection of the hardware. This relieves the application programmers from having to manage these details. Operating systems offer a number of services to application programs and users. Applications access these services through application programming interfaces (APIs) or system calls. By invoking these interfaces, the application can request a service from the operating system, pass parameters, and receive the results of the operation. In the present disclosure, the term operating system is extended to further comprise run-time environments, being collections of software services enhancing the interaction with the operating system, such as virtual machines, interfaces and program libraries.

The term "application" as used herein in the present disclosure, is defined as computer software designed to help the user to perform a singular or multiple related specific tasks. Typical examples are word processors, spreadsheets, media players, messaging software, social media software, and database applications.

Various steps of the present method may be performed electronically or automatically. As used herein, the term "automatically" indicates that one or more method steps are performed by a computer without human intervention, but potentially based on human parameters. For example, in the step of resetting the second color setting of the application to a third color setting based on a combination of the first value and the second value, the first value and the second value (as well as the first color setting and the second color setting) are stored in a computer readable form, and the resetting step is performed via the computer readable data by a computer. Optionally, an automatic step of the present method requires a user input. Optionally, an automatic step of the present method does not require a user input.

Figure 3:
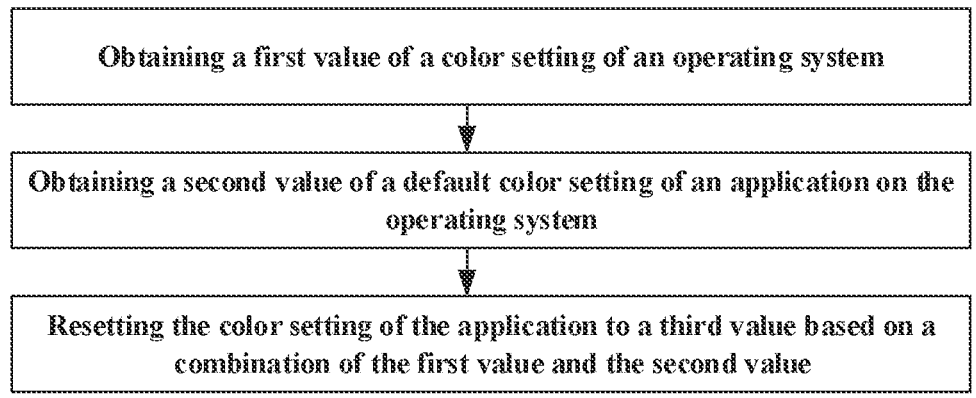
FIG. 3 is a flow chart illustrating a computer-implemented method in some embodiments according to the present disclosure.

FIG. 3 is a flow chart illustrating a computer-implemented method in some embodiments according to the present disclosure. In some embodiments, referring to FIG. 3, the computer-implemented method includes obtaining a first value of a first color setting of an operating system; obtaining a second value of a second color setting of an application on the operating system; and resetting the second color setting of the application to a third color setting based on a combination of the first value and the second value. Optionally, the third color setting is different from the first color setting, and the third color setting is different from the second color setting.

Optionally, a color setting determines themes of user interface elements, which are provided with a consistent look and feel. In one example, the user interface elements may have a same color. Optionally, user interface elements include, but are not limited to, borders, controls, icons, cursors, object borders and shadowing, menus, lists, text boxes, input boxes, buttons, scrollbars, toolbars, which contribute to the visual appearance of the user interface.

Optionally, the color setting may be represented by one of color modes including, but not limited to, RGB color mode, CMYK color mode, LAB color mode, and HSV color mode. For example, using the RGB color mode, the first color setting of the operation system can be described using three color elements, e.g., Red color elements, Green color elements, and Blue color elements. Optionally, the value of a color setting can be a value representing one of the three color elements. Optionally, the value of the color setting can be an array of values respectively representing the three color elements.

Optionally, the first color setting include one or more values selected from a group consisting of a value representing a first theme color of the operating system, a value representing a first accent color of the operating system, and a value representing a first text color of the operating system.

As used herein, the term "theme color" refers to a background color of a user interface. As used herein, the term "accent color" refers to a color displayed by a user interface to create a variety of visual effect for the user interface. Optionally, the accent color is a color similar to a theme color of a user interface. Optionally, the accent color is a color contrast with the theme color of the user interface. For example, a color of a button on the user interface is an accent color of the user interface.

Optionally, the second color setting includes one or more values selected from a group consisting of a value representing a second theme color of the application on the operating system, a value representing a second accent color of the application on the operating system, and a value representing a second text color of the application on the operating system.

Optionally, the third color setting includes one or more values selected from a group consisting of a value representing a third theme color of the application on the operating system, a value representing a third accent color of the application on the operating system, and a value representing a third text color of the application on the operating system.

Optionally, the first value is a value representing a first theme color of the operating system; the second value is a value representing a second theme color of the application on the operating system; and the third value is a value representing a third theme color. Optionally, the third value is different from the first value, and the third value is different from the second value.

Optionally, the first value may be directly obtained from a default color setting stored on the operating system. In one example, the first value of the first color setting of the operating system is a default color setting stored on the operating system. For example, the first value of the first color setting of the operating system is extracted through an application programming interface based on analysis of code resources in a system framework layer of the operating system. Optionally, the second value of the second color setting of the application is a default color setting stored on the application.

Optionally, the first value may be indirectly derived from a default color setting stored on the operating system. In one example, the operating system may be running on a dark mode, however, the only default color setting stored on the operating system is a color setting suitable for a normal mode (e.g., a bright mode). The color setting corresponding to the dark mode is not stored on the operating system. In another example, obtaining the first value of the first color setting of the operating system includes detecting the operating system is running on a dark mode; obtaining a default color setting stored on the operating system; and reducing at least one of saturation or lightness of the default color setting to obtain the first value.

For example, the default color setting stored on the operating system may be presented in a hue-saturation-lightness format, or may be converted into the true-saturation-lightness format. The method in one example includes reducing at least one of a saturation parameter or a lightness parameter of the default color setting in the hue-saturation-lightness format (presented or converted) to obtain a modified color setting. The first value is then derived from the modified color setting. Optionally, the first value may be in hue-saturation-lightness format. Optionally, the first value may be converted into an RGB format.

In some embodiments, detecting the operating system being running on the dark mode include obtaining a current timepoint through a clock application; obtaining a sunset timepoint; comparing the current timepoint and the sunset timepoint to determine whether the current time point is in a night time period to determine whether the operating system is running on the dark mode. In one example, when the current time point is later than the sunset time point, the operating system is running on the dark mode. In another example, when the current time point is earlier than the sunset time point, the operating system is not running on the dark mode.

Optionally, detecting the operating system being running on the dark mode further include obtaining a sunrise timepoint; comparing the current timepoint and the sunrise timepoint to determine whether the current time point is in a night time period to determine whether the operating system is running on the dark mode. In one example, when the current time point is earlier than the sunrise time point, the operating system is running on the dark mode. In another example, when the current time point is later than the sunrise time point, the operating system is not running on the dark mode.

Optionally, detecting the operating system being running on the dark mode include obtaining a current timepoint through a clock application; obtaining a sunset timepoint; obtaining a sunrise time point; generating a night time period; determining whether the current timepoint is in the night time period to determine whether the operating system is running on the dark mode. In one example, when the current time point is in the night time period, the operating system is running on the dark mode.

Optionally, detecting the operating system being running on a dark mode include detecting a brightness of ambient light of a region where an electronic device using the computer-implemented method described herein locates; determining whether the brightness of ambient light is in a first brightness range to determine whether the operating system is running on the dark mode.

Optionally, detecting the operating system being running on the dark mode include obtaining a screenshot of the electronic device using the computer-implemented method described herein; detecting color values representing each subpixel in the screenshot to determining a brightness of each subpixel; calculating an average brightness of the screenshot based on brightness corresponding to subpixels of the screenshot; and determining whether the average brightness is in a second brightness range to determine whether the operating system is running on the dark mode.

Optionally, various method may be used in detecting the operating system running on the dark mode. Exemplary, non-limiting, methods for detecting whether the operating system is running on the dark mode include, but are not limited to the method discussed in Chinese Patent Application No. 201911328400.4; the contents of which are incorporated herein by reference in entirety.

In some embodiments, the third color setting is determined based on the first value and the second value. Optionally, the computer-implemented method further includes generating a gradient color value array based on a combination of the first value, the second value, and a total number of sampling points in a color space containing points corresponding to the first value and the second value. Optionally, the computer-implemented method further includes determining the third value based on the gradient color value array. Optionally, the gradient color value array includes values respectively from a plurality of sampling points in a color space. Optionally, the gradient color value array includes values respectively from a plurality of sampling points in a color space containing points corresponding to the first value and the second value. In one example, the gradient color value array includes color space coordinates respectively from a plurality of sampling points in a color space containing points corresponding to the first value and the second value.

In some embodiments, the gradient color value array includes values respectively from a plurality of sampling points in a color space containing points corresponding to the first value and the second value. Optionally, at least a portion of the plurality of sampling points form a gradual transition in the color space (or in a color channel of the color space) from a point corresponding to the first value to the point corresponding to the second point. In one example, at least a portion of the plurality of sampling points form a linear gradual transition in the color space (or in a color channel of the color space) from a point corresponding to the first value to a point corresponding to the second value.

As used herein, the term "color space" refers to an N-dimensional space in which each point corresponds to a particular color. Examples of three-dimensional color space include RGB (red (R), green (G) and blue (B)) and CMY (cyan (C), magenta (M) and yellow (Y)). Examples of color spaces further include luminance-chrominance color spaces such as CIELAB, YCbCr, and HSV (hue saturation value) space.

Figure 4:
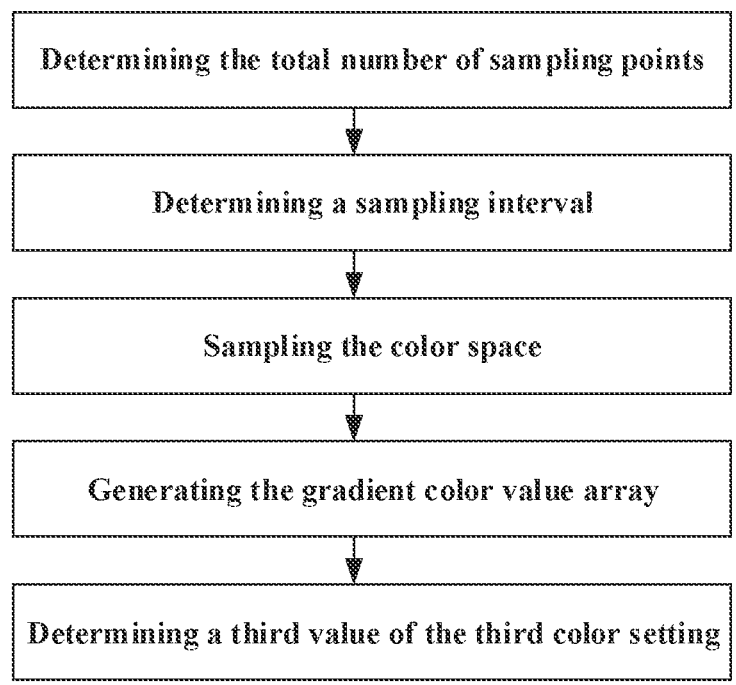
FIG. 4 is a flow chart illustrating a method of generating a gradient color value array in some embodiments according to the present disclosure.

FIG. 4 is a flow chart illustrating a method of generating a gradient color value array in some embodiments according to the present disclosure. Optionally, referring to FIG. 4, generating the gradient color value array includes determining the total number of sampling points in the color space containing points corresponding to the first value and the second value; determining a sampling interval with respect to the total number of sampling points; sampling the color space containing points corresponding to the first value and the second value; and generating gradient color value array respectively from the sampling points.

Optionally, the color space containing points corresponding to the first value and the second value is sampled based on the first value and the second value. Prior to sampling the color space containing points corresponding to the first value and the second value, the total number of the sampling points and the sampling interval between two adjacent sampling points are determined. In one example, the sampling process starts from the first point corresponding to the first value to sample each sampling point until a last sampling point is reached. Optionally, the last sampling point is the second point corresponding to the second value. Optionally, the last sampling point is on a side of the second point corresponding to the second value away from the first point corresponding to the first value. In another example, the sampling process starts from the second point corresponding to the second value to sample each sampling point until a last sampling point is reached. Optionally, the last sampling point is the first point corresponding to the first value. Optionally, the last sampling point is on a side of the first point corresponding to the first value away from the second point corresponding to the second value. Optionally, regions outside the color space between the first point and the second point are not sampled to obtain the gradient color value array. Optionally, a sampled color space is a smallest color space having all the sampling points. Optionally, the sampled color space is smaller than the color space between the first point and the second point. Optionally, the sampled color space is greater than the color space between the first point and the second point. Optionally, the sampled color space overlaps with the color space between the first point and the second point.

Figure 5:
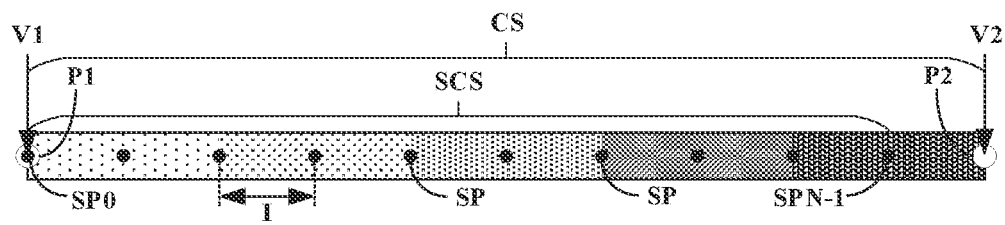
FIG. 5 is a schematic diagram illustrating a distribution of sampling points in some embodiments according to the present disclosure.

FIG. 5 is a schematic diagram illustrating a distribution of sampling points in some embodiments according to the present disclosure. Optionally, referring to FIG. 5, the sampled color space SCS is smaller than the color space CS between the first point P1 and the second point P2. The 0-th sampling point SP0 corresponds to the first point P1.

Figure 6:
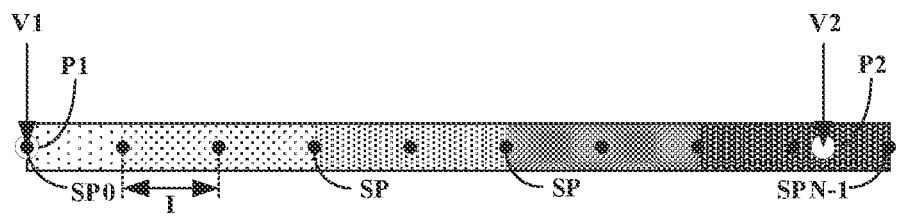
FIG. 6 is a schematic diagram illustrating a distribution of sampling points in some embodiments according to the present disclosure.
Figure 7:
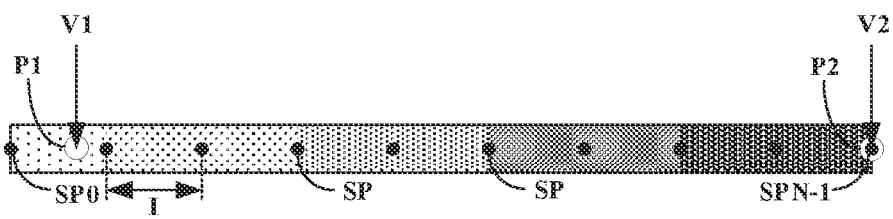
FIG. 7 is a schematic diagram illustrating a distribution of sampling points in some embodiments according to the present disclosure.

FIG. 6 is a schematic diagram illustrating a distribution of sampling points in some embodiments according to the present disclosure. FIG. 7 is a schematic diagram illustrating a distribution of sampling points in some embodiments according to the present disclosure. Optionally, referring to FIG. 6 and FIG. 7, the sampled color space SCS is greater than the color space between the first point P1 and the second point P2. At least one sampling point is outside the color space between the first point P1 and the second point P2. Referring to FIG. 6, at least one sampling point (e.g., sampling point SPN−1) is on a side of the second point P2 corresponding to the second value V2 away from the first point P1 corresponding to the first value V1. Referring to FIG. 7, at least one sampling point (e.g., sampling point SP0) is on a side of the first point corresponding to the first value V1 away from the second point P2 corresponding to the second value V2.

In one example, referring to FIG. 6, the sampling process starts from the first point P1 corresponding to the first value V1 to sample each sampling point until the last sampling point. Optionally, sampling points SP0 to SPN−1 are used to generate the gradient color value array. Optionally, sampling points in regions outside the color space between the first point P1 and the second point P2 (e.g., sampling point SPN−1) are discarded, and not used in the process of generating the gradient color value array.

In another example, referring to FIG. 7, the sampling process starts from the second point P2 corresponding to the second value V2 to sample each sampling point until the last sampling point. Optionally, sampling points SP0 to SPN−1 are used to generate the gradient color value array. Optionally, sampling points in regions outside the color space between the first point P1 and the second point P2 (e.g., sampling point SP0) are discarded, and not used in the process of generating the gradient color value array.

Optionally, adjacent sampling points are spaced apart by the sampling interval. Optionally, sampling intervals are the same. In one example, referring to FIG. 5, any two adjacent sampling points SP are spaced apart by the same sampling interval I.

Figure 8:
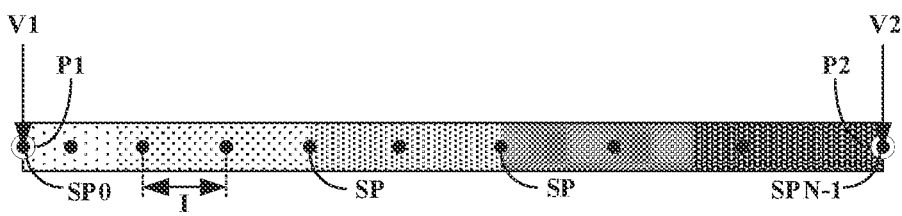
FIG. 8 is a schematic diagram illustrating a distribution of sampling points in some embodiments according to the present disclosure.
Figure 9:
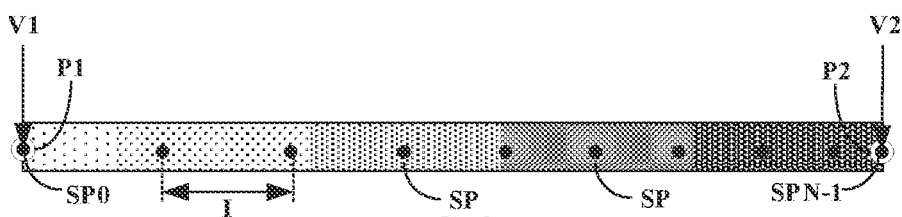
FIG. 9 is a schematic diagram illustrating a distribution of sampling points in some embodiments according to the present disclosure.

In some embodiments, at least two sampling intervals are different. FIG. 8 is a schematic diagram illustrating a distribution of sampling points in some embodiments according to the present disclosure. FIG. 9 is a schematic diagram illustrating a distribution of sampling points in some embodiments according to the present disclosure. In one example, the sampling intervals I increase along a direction from the first point P1 to the second point P2. Referring to FIG. 8, the sampling intervals I increase along the direction from the 0-th sampling point SP0 to the (N−1)-th sampling point SPN−1. In another example, the sampling intervals I decrease along the direction from the first point to the second point. Optionally, referring to FIG. 9, the sampling intervals I decrease along the direction from the 0-th sampling point SP0 to the (N−1)-th sampling point SPN−1.

Optionally, in the process of generating gradient color value array respectively from the sampling points, each of the sampling points corresponds to a value in the color space. Subsequent to sampling the color space containing points corresponding to the first value and the second value, values of sampling points are obtained and stored in the gradient color value array.

In some embodiments, the third color setting is determined based on a bias factor, the first value, and the second value. Optionally, a value of the bias factor determines whether the third color setting is biased toward the first value or toward the second value. The bias factor plays an important role in determining the distribution of the sampling points. For example, the value of the bias factor may determine whether the third color setting is more similar to the first color setting than to the second color setting, or more similar to the second color setting than to the first color setting. Optionally, biasing the third color setting includes biasing a third value of the third color setting toward one of the first value and the second value. Optionally, biasing the third value of the third color setting includes rendering, in a color space, the third value of the third color setting to be closer to one of the first value and the second value than to another of the first value and the second value. In one example, biasing the third value of the third color setting includes rendering, in a color space, the third value of the third color setting to be closer to the first value than to the second value. In another example, biasing the third value of the third color setting includes rendering, in a color space, the third value of the third color setting to be closer to the second value than to the first value.

Optionally, the bias factor is in a range from 0 to 1. In one example, when the bias factor is adjusted in a range of 0 to 0.5, the third value is biased toward the second value. In another example, when the bias factor is adjusted in a range of 0.5 to 1, the third value is biased toward the first value.

Optionally, the bias factor is in a range from 0 to 1. In one example, when the bias factor is adjusted in a range of 0 to 0.5, the third value is biased toward the first value. In another example, when the bias factor is adjusted in a range of 0.5 to 1, the third value is biased toward the second value.

Optionally, when the sampling points are more densely distributed in a region closer to the first value than in a region closer to the second value, the third color setting obtained based on the sampling points is biased toward the first value. For example, the first value represents a white color, and the second value represents a blue color, when the sampling points are more densely distributed in a region closer to the first value than in a region closer to the second value, the third color setting obtained based on the sampling points has a color closer to white color, but still shows the characters of both the white color and the blue color, e.g., a relatively light blue color.

Optionally, when the sampling points are more densely distributed in a region closer to the second value than in a region closer to the first value, the third color setting obtained based on the sampling points is biased toward the second value. For example, the first value represents a white color, and the second value represents a blue color, when the sampling points are more densely distributed in a region closer to the second value than in a region closer to the first value, the third color setting obtained based on the sampling points has a color closer to blue color, but still shows the characters of both the white color and the blue color, e.g., a relatively dark blue color.

Optionally, the computer-implemented method further includes adjusting the bias factor to bias the third value of the third color setting toward one of the first value and the second value. For example, by adjusting the bias factor, the distribution of sampling points can be changed, a different gradient color value array can be determined based on the altered distribution of the sampling points, and a new third value of the third color setting can be obtained from the gradient color value array. By adjusting the bias factor, the third value of the third color setting is accordingly adjusted.

Optionally, the bias factor is adjusted by an application using the computer-implemented method described herein. Optionally, the bias factor is adjusted by a user of the application using the computer-implemented method described herein. In one example, the computer-implemented method further includes generating an adjustment bar on a user interface allowing a user to adjust the bias factor.

Figure 10:
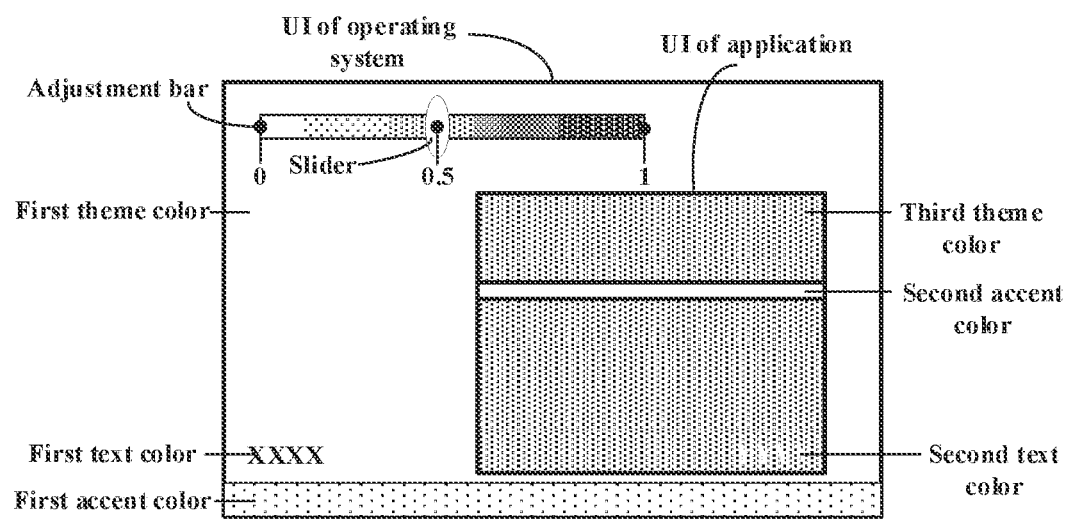
FIG. 10 is a schematic diagram showing an adjustment bar in some embodiments according to the present disclosure.

FIG. 10 is a schematic diagram showing an adjustment bar in some embodiments according to the present disclosure. For example, when a slider representing the bias factor is dragged to a point corresponding to the intermediate point (e.g., 0.5) on the adjustment bar, the third theme color is an intermediate color between the first theme color of the operating system and the second theme color of the application.

Figure 11:
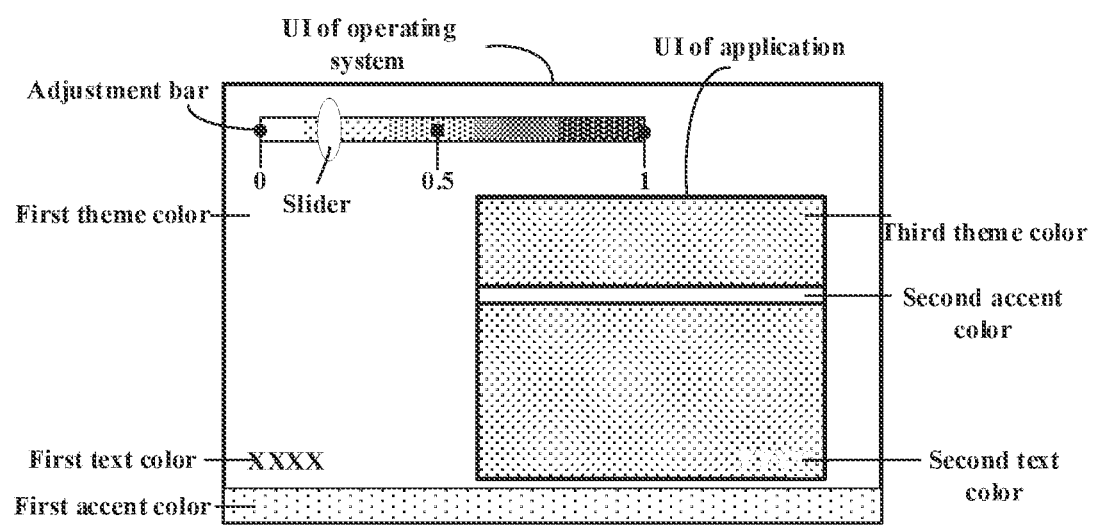
FIG. 11 is a schematic diagram showing an adjustment bar in some embodiments according to the present disclosure.

FIG. 11 is a schematic diagram showing an adjustment bar in some embodiments according to the present disclosure. For example, when the slider is dragged to a point closer to the first limit value (e.g., 0) than to the second limit value (e.g., 1) on the adjustment bar, the third theme color is a color more similar to the first theme color of operating system as compared to the intermediate color discussed in connection with FIG. 10.

Figure 12:
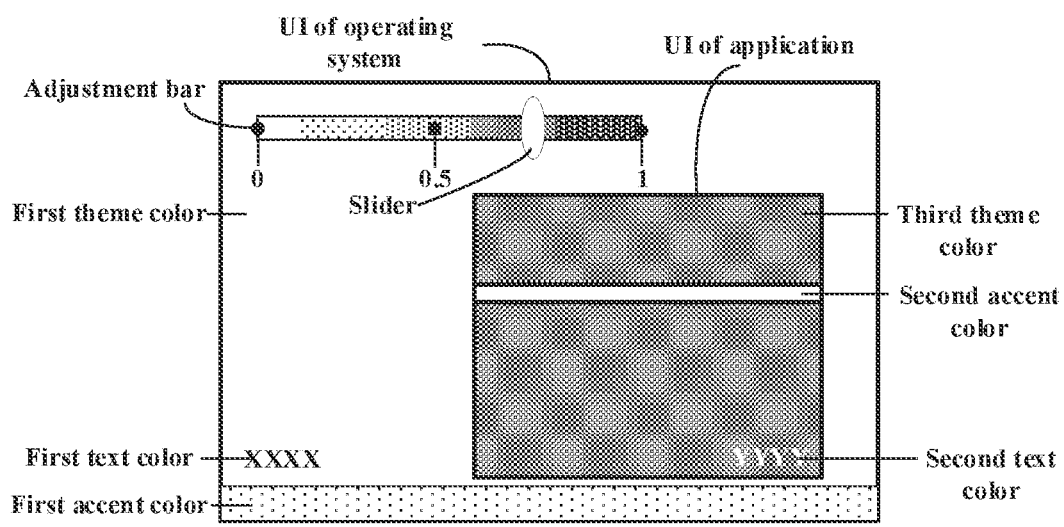
FIG. 12 is a schematic diagram showing an adjustment bar in some embodiments according to the present disclosure.

FIG. 12 is a schematic diagram showing an adjustment bar in some embodiments according to the present disclosure. For example, when the slider is dragged to a point closer to the second limit value (e.g., 1) than to the first limit value (e.g., 0) on the adjustment bar, the third theme color is a color more similar to the second theme color of operating system as compared to the intermediate color discussed in connection with FIG. 10.

By introducing the bias factor, the third color setting can be freely adjusted in a range between the first color setting and the second color setting, resulting in great flexibility in setting the color setting of the application. By providing adjustment bar allowing a user to adjust the bias factor, the computer-implementing method can display a color setting of the application according to the user's preference, which can increase a level of interaction between user and the electronic devices using the computer-implemented method described herein.

In some embodiments, the computer-implemented method further includes generating a gradient color value array based on a combination of the first value, the second value, the bias factor, and a total number of sampling points in a color space containing points corresponding to the first value and the second value.

Figure 13:
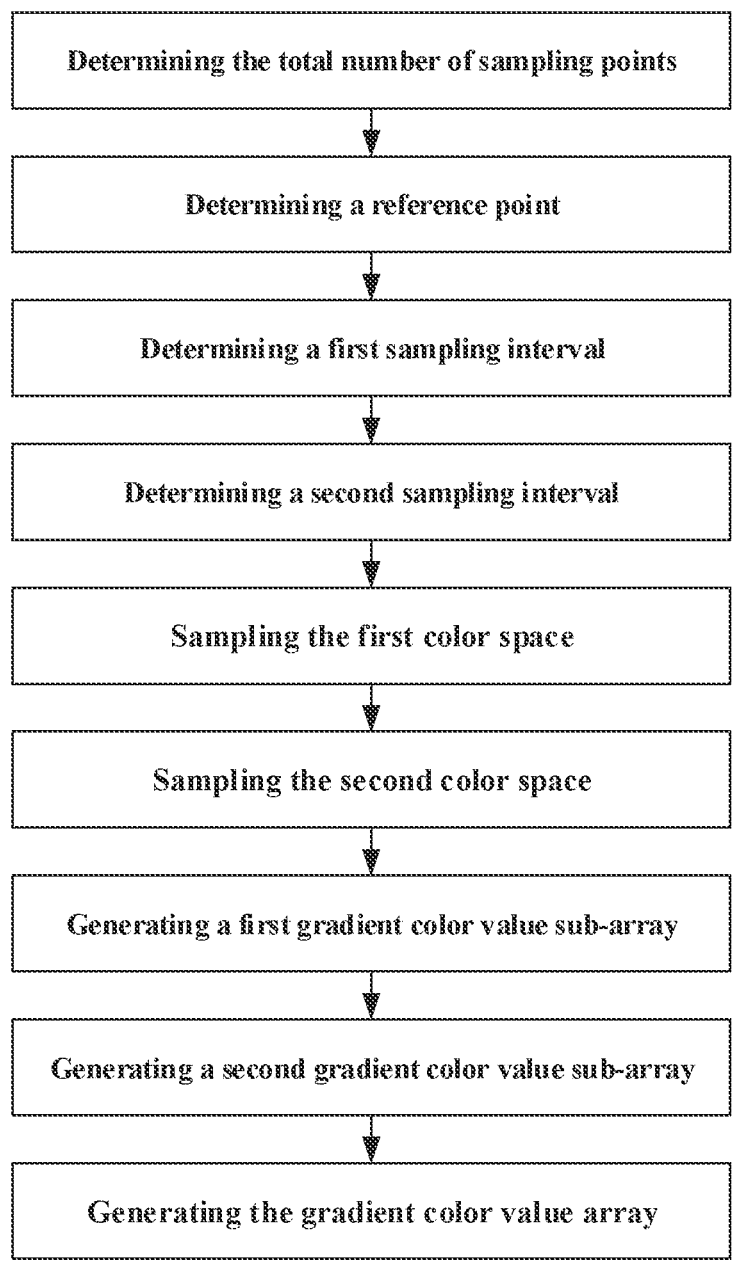
FIG. 13 is a flow chart illustrating a method of generating a gradient color value array in some embodiments according to the present disclosure.

FIG. 13 is a flow chart illustrating a method of generating a gradient color value array in some embodiments according to the present disclosure. In some embodiments, referring to FIG. 13, generating the gradient color value array includes determining the total number of sampling points in the color space containing points corresponding to the first value and the second value; determining a reference point dividing the color space into a first color space and a second color space, the reference point being between a first point corresponding to the first value and a second point corresponding to the second value; determining a first sampling interval with respect to a first sub-set of sampling points in the first color space and a second sampling interval with respect to a second sub-set of sampling points in the second color space; sampling the first color space respectively at first type sampling points in the first sub-set of sampling points, adjacent first type sampling points spaced apart by the first sampling interval; sampling the second color space respectively at second type sampling points in the second sub-set of sampling points, adjacent second type sampling points spaced apart by the second sampling interval; generating a first gradient color value sub-array including values respectively from the first type sampling points; and generating a second gradient color value sub-array including values respectively from the second type sampling points. Optionally, the gradient color value array includes the first gradient color value sub-array and the second gradient color value sub-array.

Optionally, the bias factor has a value selected from a range between a first limit value and a second limit value. For example, the first limit value is 0, and the second limit value is 1.

Figure 14:
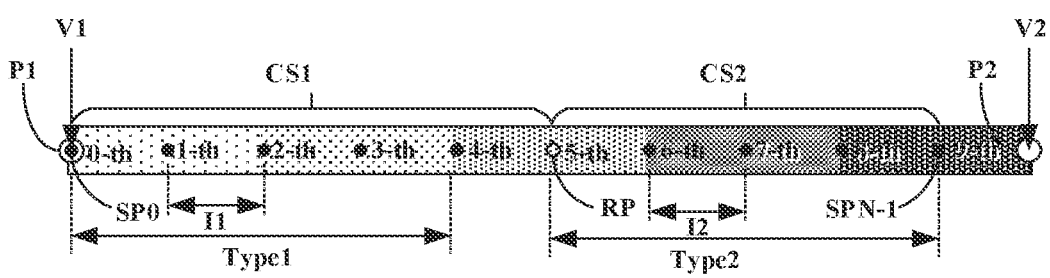
FIG. 14 is a schematic diagram illustrating a distribution of sampling points in some embodiments according to the present disclosure.

FIG. 14 is a schematic diagram illustrating a distribution of sampling points in some embodiments according to the present disclosure. Optionally, when the bias factor is adjusted to an intermediate value between the first limit value and the second limit value, the first sampling interval and the second sampling interval are the same. For example, referring to FIG. 14, a value of the bias factor can be adjusted between 0 and 1, and when the bias factor is adjusted to 0.5, the first sampling interval I1 and the second sampling interval I2 are the same.

Figure 15:
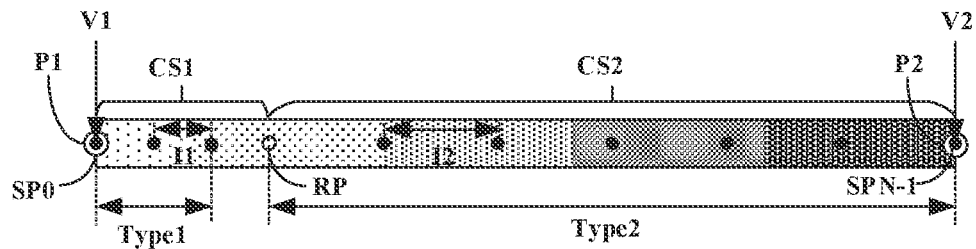
FIG. 15 is a schematic diagram illustrating a distribution of sampling points in some embodiments according to the present disclosure.

FIG. 15 is a schematic diagram illustrating a distribution of sampling points in some embodiments according to the present disclosure. Optionally, when the bias factor is adjusted closer to the first limit value than to the second limit value, the first sampling interval is smaller than the second sampling interval. For example, referring to FIG. 15, a value of the bias factor can be adjusted between 0 and 1, and when the bias factor is adjusted to be smaller than 0.5, the first sampling interval I1 is smaller than the second sampling interval I2.

Figure 16:
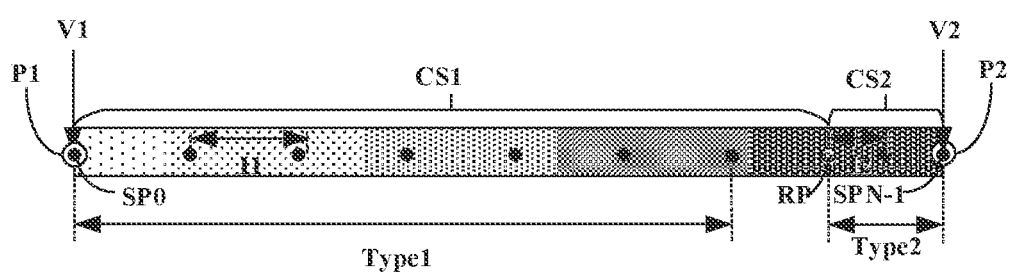
FIG. 16 is a schematic diagram illustrating a distribution of sampling points in some embodiments according to the present disclosure.

FIG. 16 is a schematic diagram illustrating a distribution of sampling points in some embodiments according to the present disclosure. Optionally, when the bias factor is adjusted closer to 1 than to 0, the first sampling interval is greater than the second sampling interval. For example, referring to FIG. 16, a value of the bias factor can be adjusted between 0 and 1, and when the bias factor is adjusted to be greater than 0.5, the first sampling interval I1 is greater than the second sampling interval I2.

In some embodiments, a color space includes a plurality of points having different colors and continuously arranged along a direction from one end of the color space to another end of the color space, forming a color gradient. For example, the color space containing points corresponding to the first value and the second value includes a plurality of points having different colors and continuously arranged along a direction from the first value to the second value, forming a color gradient. Optionally, the total number of the plurality of points in the color space containing points corresponding to the first value and the second value is finite. For example, in a red color channel, a color space from R0 to R255 includes 256 number of the points; in a green color channel, a color space from G0 to G255 includes 256 number of the points; in a blue color channel, a color space from B0 to B255 includes 256 number of the points.

Optionally, the sampling points are selected from the plurality of points in the color space containing points corresponding to the first value and the second value. In one example, the sampling points are selected from the plurality of points in the color space between the first point corresponding to the first value and the second point corresponding to the second value.

Optionally, the total number of the sampling points is no more than the total number of the plurality of points in the color space containing points corresponding to the first value and the second value. For example, a ratio of the total number of the sampling points to the total number of the plurality of points in the color space containing points corresponding to the first value and the second value is in a range from 1:2 to 1:20, e.g., 1:2 to 1:5, 1:5 to 1:10, 1:10 to 1:15, or 1:15 to 1:20.

Optionally, the total number of the sampling points is determined by the application using the computer-implemented method described herein. Optionally, the total number of the sampling points is determined by the user of the application using the computer-implemented method described herein. For example, a sampling point control bar is provided in the user interface of the application, so that user can chose the total number of the sampling points through the control bar.

Referring to FIG. 14, for example, the 0-th sampling point SP0 corresponds to the first point P1. The (N−1)-th sampling point SPN−1 corresponds to a sampling point closer to the second point P2. A total of ten sampling points SP are selected from the plurality of points in the color space between the first points P1 and the second point P2.

In some embodiments, subsequent to determine the total number of sampling points, the step of generating gradient color value array further includes determining the reference point. Various appropriate methods for determining the reference point may be implemented in the present disclosure. In one example, the reference point is a median point of the sampling points. In another example, the reference point is determined by the total number of sampling points and the bias factor.

Optionally, the reference point corresponds to an n-th sampling point of N number of sampling points, wherein 0<n<N; N is the total number of sampling points, n is an integer closest to a value obtained by multiplying the bias factor by the total number of sampling points in the color space containing the first point corresponding to the first value and the second point corresponding to the second value. For example, subsequent to determining the total number of sampling points, the bias factor is adjusted to assign a sampling point as the reference point (e.g., the n-th sampling point is assigned as the reference point).

In one example, referring to FIG. 14, the total number of sampling points N is 10, and the bias factor is 0.5. Because an integer closest to a value obtained by multiplying the bias factor 0.5 by the total number of sampling points 10 is 5, n is set to be 5. Reference point RP is assigned to be the 5-th sampling point.

In some embodiments, referring to FIG. 14, the reference point RP (e.g., the 5-th sampling point) divides the color space containing points corresponding to the first value V1 and the second value V2 into the first color space CS1 and the second color space CS2. Optionally, the reference point RP is between the first point (e.g., the 0-th sampling point) corresponding to the first value V1 and the second point (e.g., 9-th sampling point) corresponding to the second value V2. Optionally, the reference point RP is included in the second color space CS2.

In some embodiments, referring to FIG. 14, the reference point RP (e.g., the 5-th sampling point) is configured to divide the sampling points into the first sub-set of sampling points and the second sub-set of sampling points. The first sub-set of sampling points is in the first color space CS1. The second sub-set of sampling points is in the second color space CS2. For example, the reference point RP is included in the second sub-set of sampling points.

In some embodiments, sampling points of the first sub-set of sampling points are the first type sampling points Type1 in the first color space CS1, sampling points of the second sub-set of sampling points are the second type sampling points Type2 in the second color space CS2. For example, the reference point RP belongs to the second type sampling points Type2 in the second color space CS2.

In some embodiments, subsequent to determine the first type sampling points and the second type sampling points, the step of generating gradient color value array further includes determining the first sampling interval with respect to the first type sampling point and the second sampling interval with respect to the second type sampling points.

Figure 17:
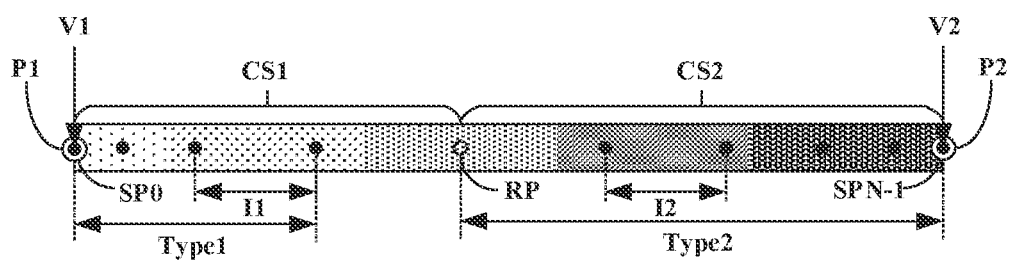
FIG. 17 is a schematic diagram illustrating a distribution of sampling points in some embodiments according to the present disclosure.
Figure 18:
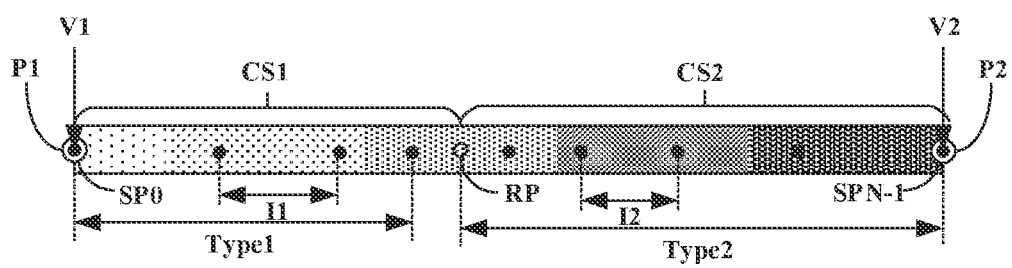
FIG. 18 is a schematic diagram illustrating a distribution of sampling points in some embodiments according to the present disclosure.

FIG. 16 is a schematic diagram illustrating a distribution of sampling points in some embodiments according to the present disclosure. FIG. 17 is a schematic diagram illustrating a distribution of sampling points in some embodiments according to the present disclosure. Optionally, referring to FIG. 14 to FIG. 16, the first sampling intervals in the first color space are the same, the second sampling intervals in the second color space are the same. Optionally, referring to FIG. 17, the first sampling intervals and the second sampling intervals increase along directions respectively from two ends of the color space toward the reference point RP. Optionally, referring to FIG. 18, the first sampling intervals and the second sampling intervals decrease along directions respectively from two ends of the color space toward the reference point RP.

Optionally, a sampling interval between the last sampling point of the first type sampling points and the first sampling point of the second type of sampling points is the same as the first sampling interval. Optionally, a sampling interval between the last sampling point of the first type sampling points and the first sampling point of the second type of sampling points is the same as the second sampling interval. Optionally, a sampling interval between the last sampling point of the first type sampling points and the first sampling point of the second type of sampling points can be other values, e.g., the sampling interval between the last sampling point of the first type sampling points and the first sampling point of the second type of sampling points is different from the first sampling interval, and is different from the second sampling interval.

In some embodiments, the first sampling interval and the second sampling interval are determined based on the first value, the second value, the bias factor, and the total number of the sampling points.

Optionally, the first sampling interval is determined according to Equation (1):

$$I1=(V2-V1)*B/(N*(1-B)) \qquad (1);$$

wherein I1 stands for the first sampling interval; V2 stands for the second value; V1 represents the first value; B stands for the bias factor; and N stands for the total number of sampling points.

Optionally, second sampling interval is determined according to Equation (3):

$$I2=(V2-V1)*(1-B)/(N*B) \qquad (3);$$

wherein I2 represents the second sampling interval; V2 represents the second value; V1 represents the first value; B represents the bias factor; and N represents the total number of sampling points.

Optionally, positions (e.g., color space coordinates) of the first type sampling points Type1 in the first color space CS1 are determined based on the first sampling interval I1. Optionally, positions (e.g., color space coordinates) of the second type sampling points Type2 in the second color space CS2 are determined based on the second sampling interval I2.

Optionally, subsequent to obtaining the first sampling interval, the second sampling interval, the reference point, and the total number of the sampling points, the step of generating the gradient color value array further includes sampling the first color space to obtain values of the first type sampling points, and sampling the second color space to obtain values of the second type sampling points.

Optionally, the value of an i-th sampling point within the first sub-set of sampling points is determined according to Equation (2):

$$Vi=V1+I1*i \qquad (2);$$

wherein Vi stands for the value of the i-th sampling point among the N number of sampling points; V1 stands for the first value; i is an integer; and $0 \leq i < n$.

Optionally, the value of a j-th sampling point within the second sub-set of sampling points is determined according to Equation (4):

$$Vj=V1+I1*n+I2*(j-n) \qquad (4);$$

wherein Vj stands for the value of the j-th sampling point among the N number of sampling points; V1 stands for the first value; I1 stands for the first sampling interval; I2 stands for the second sampling interval; j is an integer; and $n \leq j < N$.

In some embodiments, according to the equations (1) to (4), the bias factor is used to determine the reference point, thereby determining the number of the first type sampling points and the number of second type sampling points. The bias factor is also configured to determine the values of the first sampling interval and the second sampling interval.

For example, referring to FIG. 14, the bias factor B=0.5. The number of the first type sampling points and the number of the second type sampling points are the same. The first sampling interval and the second sampling interval are the same. Therefore, the sampling points are evenly distributed within the color space containing the first point P1 and the second point P2.

Referring to FIG. 14, the first value V1 and the second value V2 can be obtained or derived respectively from the operating system and the application, the difference between the first value V1 and the second value V2 is ΔV. The total number of the sampling points N is determined as 10. The bias factor B is determined as 0.5. The reference point RP is the 5-th point, because n equals to bias factor B (i.e. 0.5) multiplied by the total number of the sampling points N (i.e. 10). Based on the reference point RP, the first type sampling points Type1 in the first sub-set of sampling points includes the 0-th sampling point SP0, the 1-th sampling point, the 2-th sampling point, the 3-th sampling point, and the 4-th sampling point; the second type sampling points Type2 in the second sub-set of sampling points includes the 5-th sampling point, the 6-th sampling point, the 7-th sampling point, the 8-th sampling point, and the 9-th sampling point.

According to the equation (1), the first sampling interval I1 is $$\frac{1}{10}\Delta V.$$

Based on the equation (2), the 0-th sampling point SP0 is assigned to the first point P1 corresponding to the first value V1. According to the equation (2), the value of the i-th sampling point within the first sub-set of sampling points can be calculated based on the first value V1 and the first sampling interval I1. For example, the value of the 2-th sampling point is the first value V1 plus two number of first sampling intervals.

According to the equation (3), the second sampling interval I2 is $$\frac{1}{10}\Delta V.$$

The first sampling interval I1 and the second sampling interval I2 are the same. According to the equation (4), the value of the j-th sampling point within in the second sub-set of sampling points can be calculated based on the first value V1, the first sampling interval I1, and the second sampling interval I2. In one example, the sampling interval between the last sampling point (e.g., 4-th sampling point) of the first type sampling points and the first sampling point (e.g., the 5-th sampling point, the reference point) of the second type of sampling points is the same as the first sampling interval. The value of the 6-th sampling point is the first value V1 plus five number of the first sampling intervals and plus one number of the second sampling interval.

Referring to FIG. 15, the first value V1 and the second value V2 can be obtained or derived respectively from the operating system and the application, the difference between the first value V1 and the second value V2 is ΔV. The total number of the sampling points N is determined as 10. The bias factor B is determined as 0.3. The reference point RP is the 3-th point, because n equals to bias factor B (i.e. 0.3) multiplied by the total number of the sampling points N (i.e. 10). Based on the reference point RP, the first type sampling points Type 1 in the first sub-set of sampling points includes the 0-th sampling point SP0, the 1-th sampling point, and the 2-th sampling point; the second type sampling points Type2 in the second sub-set of sampling points includes the 3-th sampling point, the 4-th sampling point, the 5-th sampling point, the 6-th sampling point, the 7-th sampling point, the 8-th sampling point, and the 9-th sampling point.

As compared to FIG. 14, the bias factor B used in the process depicted in FIG. 15 is adjusted closer to the first limit value (e.g., 0) than that the second limit value (e.g., 1). As shown in FIG. 15, and according to the equation (1) and the equation (3), the first sampling interval I1 is set to be smaller than the second sampling interval I2. Based on the equation (2), the 0-th sampling point SP0 is assigned to the first point P1 corresponding to the first value V1. According to the equation (2), the value of the i-th sampling point within the first sub-set of sampling points can be calculated based on the first value V1 and the first sampling interval I1. For example, the value of the 2-th sampling point is the first value V1 plus two number of first sampling intervals.

According to the equation (4), the value of the j-th sampling point within in the second sub-set of sampling points can be calculated based on the first value V1, the first sampling interval I1, and the second sampling interval I2. In one example, the sampling interval between the last sampling point (e.g., the 2-th sampling point) of the first type sampling points and the first sampling point (e.g., the 3-th sampling point, the reference point) of the second type of sampling points is the same as the first sampling interval. The value of the 4-th sampling point is the first value V1 plus three number of the first sampling intervals and plus one number of the second sampling interval.

Referring to FIG. 16, the first value V1 and the second value V2 can be obtained or derived respectively from the operating system and the application, the difference between the first value V1 and the second value V2 is ΔV. The total number of the sampling points N is determined as 10. The bias factor B is determined as 0.7. The reference point RP is the 7-th point, because n equals to bias factor B (i.e. 0.7) multiplied by the total number of the sampling points N (i.e. 10). Based on the reference point RP, the first type sampling points Type 1 in the first sub-set of sampling points includes the 0-th sampling point SP0, the 1-th sampling point, the 2-th sampling point, the 3-th sampling point, the 4-th sampling point, the 5-th sampling point, and the 6-th sampling point; the second type sampling points Type2 in the second sub-set of sampling points includes the 7-th sampling point, the 8-th sampling point, and the 9-th sampling point.

As compared to FIG. 14, the bias factor B used in the process depicted in FIG. 16 is adjusted closer to the second limit value (e.g., 1) than that the first limit value (e.g., 0). As shown in FIG. 16, and according to the equation (1) and the equation (3), the first sampling interval I1 is set to be greater than the second sampling interval I2. Based on the equation (2), the 0-th sampling point SP0 is assigned to the first point P1 corresponding to the first value V1. According to the equation (2), the value of the i-th sampling point within the first sub-set of sampling points can be calculated based on the first value V1 and the first sampling interval I1. For example, the value of the 2-th sampling point is the first value V1 plus two number of first sampling intervals.

According to the equation (4), the value of the j-th sampling point within in the second sub-set of sampling points can be calculated based on the first value V1, the first sampling interval I1, and the second sampling interval I2. In one example, the sampling interval between the last sampling point (e.g., the 6-th sampling point) of the first type sampling points and the first sampling point (e.g., the 7-th sampling point, the reference point) of the second type of sampling points is the same as the first sampling interval. The value of the 8-th sampling point is the first value V1 plus seven number of the first sampling intervals and plus one number of the second sampling interval.

In some embodiments, the computer-implemented method further includes separating the color space into a plurality of color channels. Optionally, in a respective color channel, generating the gradient color value array includes determining the total number of sampling points in the respective color channel containing points corresponding to a first channel value and a second channel value. For example, the first channel value is a value of a color setting of an operating system with respect to the respective color channel, and the second channel value is a value of a default color setting of an application on the operating system with respect to the respective color channel, Optionally, generating the gradient color value array includes determining a reference point dividing the color space into a first color space and a second color space. For example, the reference point is between a first point corresponding to the first channel value and a second point corresponding to the second channel value. Optionally, generating the gradient color value array includes determining a first sampling interval with respect to a first sub-set of sampling points in the first color space and a second sampling interval with respect to a second sub-set of sampling points in the second color space; sampling the first color space respectively at first type sampling points in the first sub-set of sampling points, adjacent first type sampling points spaced apart by the first sampling interval; sampling the second color space respectively at second type sampling points in the second sub-set of sampling points, adjacent second type sampling points spaced apart by the second sampling interval; and generating a first gradient color value sub-array including values respectively from the first type sampling points; and generating a second gradient color value sub-array including values respectively from the second type sampling points. Optionally, the gradient color value array includes the first gradient color value sub-array and the second gradient color value sub-array. The processes depicted in FIGS. 14-18 with respect to color space are similarly applicable to processes with respect to color channels.

Optionally, the plurality of color channels includes a red color channel, a blue color channel, and a green color channel.

In one example, in the red color channel, generating the gradient color value array includes generating a gradient red color value array. Generating the gradient red color value array includes determining the total number of sampling points in the red color channel containing points corresponding to a first red channel value and a second red channel value. For example, the first red channel value is a value of a red color setting of the operating system with respect to the red color channel, and the second red channel value is a value of a default red color setting of the application on the operating system with respect to the red color channel. Optionally, generating the gradient red color value array includes determining a reference point dividing the red color space into a first red color space and a second red color space. For example, the reference point is between a first point corresponding to the first red channel value and a second point corresponding to the second red channel value. Optionally, generating the gradient red color value array includes determining a first red sampling interval with respect to a first sub-set of red sampling points in the first red color space and a second red sampling interval with respect to a second sub-set of red sampling points in the second red color space; sampling the first red color space respectively at first type red sampling points in the first sub-set of red sampling points, adjacent first type red sampling points spaced apart by the first red sampling interval; sampling the second red color space respectively at second type red sampling points in the second sub-set of red sampling points, adjacent first type red sampling points spaced apart by the second red sampling interval; and generating a first gradient red color value sub-array including values respectively from the first type red sampling points; and generating a second gradient red color value sub-array including values respectively from the second type red sampling points. Optionally, the gradient red color value array includes the first gradient red color value sub-array and the second gradient red color value sub-array.

In another example, in the green color channel, generating the gradient color value array includes generating a gradient green color value array. Generating the gradient green color value array includes determining the total number of sampling points in the green color channel containing points corresponding to a first green channel value and a second green channel value. For example, the first green channel value is a value of a green color setting of the operating system with respect to the green color channel, and the second green channel value is a value of a default green color setting of the application on the operating system with respect to the green color channel. Optionally, generating the gradient green color value array includes determining a reference point dividing the green color space into a first green color space and a second green color space. For example, the reference point is between a first point corresponding to the first green channel value and a second point corresponding to the second green channel value. Optionally, generating the gradient re color value array includes determining a first green sampling interval with respect to a first sub-set of green sampling points in the first green color space and a second green sampling interval with respect to a second sub-set of green sampling points in the second green color space; sampling the first green color space respectively at first type green sampling points in the first sub-set of green sampling points, adjacent first type green sampling points spaced apart by the first green sampling interval; sampling the second green color space respectively at second type green sampling points in the second sub-set of green sampling points, adjacent first type green sampling points spaced apart by the second green sampling interval; and generating a first gradient green color value sub-array including values respectively from the first type green sampling points; and generating a second gradient green color value sub-array including values respectively from the second type green sampling points. Optionally, the gradient green color value array includes the first gradient green color value sub-array and the second gradient green color value sub-array.

In another example, in the blue color channel, generating the gradient color value array includes generating the gradient blue color value array. Generating the gradient blue color value array includes determining the total number of sampling points in the blue color channel containing points corresponding to a first blue channel value and a second blue channel value. For example, the first blue channel value is a value of a blue color setting of the operating system with respect to the blue color channel, and the second blue channel value is a value of a default blue color setting of the application on the operating system with respect to the blue color channel. Optionally, generating the gradient blue color value array includes determining a reference point dividing the blue color space into a first blue color space and a second blue color space. For example, the reference point is between a first point corresponding to the first blue channel value and a second point corresponding to the second blue channel value. Optionally, generating the gradient blue color value array includes determining a first blue sampling interval with respect to a first sub-set of blue sampling points in the first blue color space and a second blue sampling interval with respect to a second sub-set of blue sampling points in the second blue color space; sampling the first blue color space respectively at first type blue sampling points in the first sub-set of blue sampling points, adjacent first type blue sampling points spaced apart by the first blue sampling interval; sampling the second blue color space respectively at second type blue sampling points in the second sub-set of blue sampling points, adjacent first type blue sampling points spaced apart by the second blue sampling interval; and generating a first gradient blue color value sub-array including values respectively from the first type blue sampling points; and generating a second gradient blue color value sub-array including values respectively from the second type blue sampling points. Optionally, the gradient blue color value array includes the first gradient blue color value sub-array and the second gradient blue color value sub-array.

Figure 19:
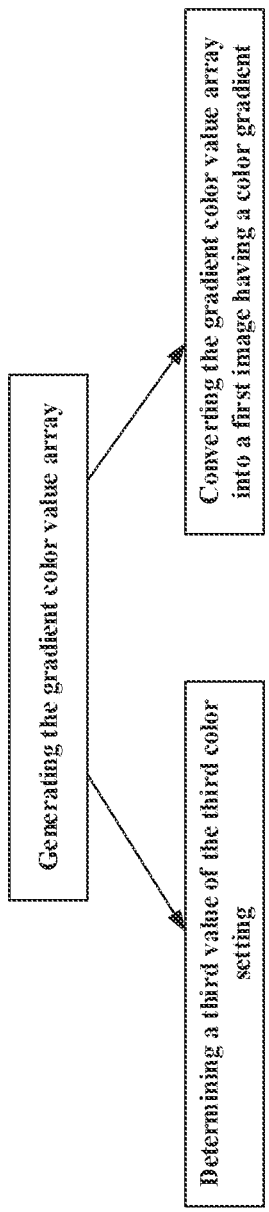
FIG. 19 is a flow chart illustrating a computer-implemented method in some embodiments according to the represent disclosure.

FIG. 19 is a flow chart illustrating a computer-implemented method in some embodiments according to the present disclosure. In some embodiments, referring to FIG. 19, subsequent to generating the gradient color value array, the computer-implemented method further includes determining a third value of the third color setting by selecting a most representative color value in the gradient color value array.

In some embodiments, the computer-implemented method further includes separating the color space into a plurality of color channels. Optionally, subsequent to generating the gradient color value array, the computer-implemented method further includes, in each of the plurality of color channels, selecting a most representative color value in the gradient color value array, thereby determining a third value of the third color setting. In one example, the computer-implemented method further includes selecting a first most representative color value in the gradient red color value array; selecting a second most representative color value in the gradient green color value array; selecting a third most representative color value in the gradient blue color value array; and determining the third value of the third color setting based on the first most representative color value, the second most representative color value, and the third most representative color value.

Various appropriate algorithms may be used to determine the third value of the third color setting. Examples of algorithms suitable for determining the third value of the third color setting include, but are not limited to, color quantization algorithms and clustering algorithms. Optionally, the color quantization algorithms include, but are not limited to, median cut, and octree algorithm. Optionally, the clustering algorithms include, but are not limited to, KMeans algorithm.

In some embodiments, the computer-implemented method further includes determining the third value of the third color setting by performing a median cut algorithm on the gradient color value array. Optionally, performing the median cut algorithm on the gradient color value array includes determining a smallest three-dimensional box within color space that contains all sampling points in the gradient color value array; and dividing the smallest three-dimensional box into a plurality of defined regions based on the median cut algorithm. Optionally, dividing the smallest three-dimensional box into the plurality of defined regions includes sorting the sampling points within the smallest three-dimensional box along a longest axis of the smallest three-dimensional box; dividing the smallest three-dimensional box into two regions at a median of sorted sampling points; and applying sorting and dividing to the two regions until the smallest three-dimensional box has been divided into the plurality of defined regions.

Optionally, the computer-implemented method further includes assigning the plurality of defined regions as a plurality of selected defined regions; and respectively selecting a plurality of representative color values in the plurality of selected defined regions as a plurality of candidate third values of a plurality of candidate third color setting. In one example, the computer-implemented method further includes selecting a third color setting from the plurality of candidate third color settings; and resetting the second color setting of the application to the third color setting. In another example, the computer-implemented method further includes providing the plurality of candidate third color settings to the user; detecting a third color setting which is selected by the user; and resetting the second color setting of the application to the third color setting.

For example, a respective one of the plurality of representative color values is a value of a most representative sampling point in the respective one of the plurality of selected defined regions. A sum of Euclidean distances between the most representative sampling point in the respective one of the plurality of selected defined regions and other sampling points in the respective one of the plurality of selected defined regions is less than any of corresponding sums of Euclidean distances for the other sampling points. Optionally, a total number of most representative sampling points is the same as the total number of the plurality of selected defined regions.

Optionally, the computer-implemented method further includes assigning one of the plurality of defined regions as a selected defined region; and selecting a most representative color value in the selected defined region as a third value of the third color setting.

For example, the most representative color value is a color value of a most representative sampling point. A sum of Euclidean distances between the most representative sampling point and other sampling points in the selected defined region is less than any of corresponding sums of Euclidean distances for the other sampling points.

In some embodiments, the computer-implemented method further includes determining the third value of the third color setting by selecting a most representative color value in the smallest three-dimensional box within color space that contains all sampling points in the gradient color value array. Optionally, the third value of the third color setting is a color value of a most representative sampling point in the smallest three-dimensional box within color space that contains all sampling points in the gradient color value array. Optionally, a sum of Euclidean distances between the most representative sampling point and other sampling points in the smallest three-dimensional box within color space that contains all sampling points in the gradient color value array is less than any of corresponding sums of Euclidean distances for the other sampling points.

In some embodiments, referring to FIG. 19, subsequent to generating the gradient color value array, the computer-implemented method further includes converting the gradient color value array into a first image having a color gradient. Optionally, the first image has a dimension substantially same as a second image in the application on the operating system. Optionally, the computer-implemented method further includes replacing the second image in the application on the operating system with the first image.

As used herein, the term "substantially same" refers to a difference between two values not exceeding 10% of a base value (e.g., one of the two values), e.g., not exceeding 8%, not exceeding 6%, not exceeding 4%, not exceeding 2%, not exceeding 1%, not exceeding 0.5%, not exceeding 0.1%, not exceeding 0.05%, and not exceeding 0.01%, of the base value.

For example, a background image of the application is the second image. The first image obtained based on the gradient color value array can be used to replace the second image (e.g., background image) of the application, so that the color of the background of the application shows a combination of the theme color of the operating system and the previous theme color of the application.

Optionally, converting the gradient color value array into the first image includes defining a color value list (colorIntList) having the values in the gradient color value array (e.g., by using an equation: int[ ] colorIntList=new int [colorList.size( )]). Optionally, the first image is generated using a CreatBitmap function (e.g., by using an instruction: Bitmap.createBitmap(colorIntList, width, height, Bitmap-.Config.ARGB_4444). Optionally, a width and a height of the first image corresponds to a width and a height of the second image. For example, the width of the first image and the width of the second image are the same, and the height of the first image and the height of the second image are the same.

By introducing the bias factor, the third color setting can be freely adjusted in a range between the first color setting and the second color setting, resulting in great flexibility in setting the color setting of the application. By providing adjustment bar allowing a user to adjust the bias factor, the computer-implementing method can display a color setting of the application according to the user's preference, which can increase a level of interaction between user and the electronic devices using the computer-implemented method described herein.

In another aspect, the present disclosure also provides an apparatus including a memory; one or more processors. Optionally, the memory and the one or more processors are connected with each other.

Figure 20:
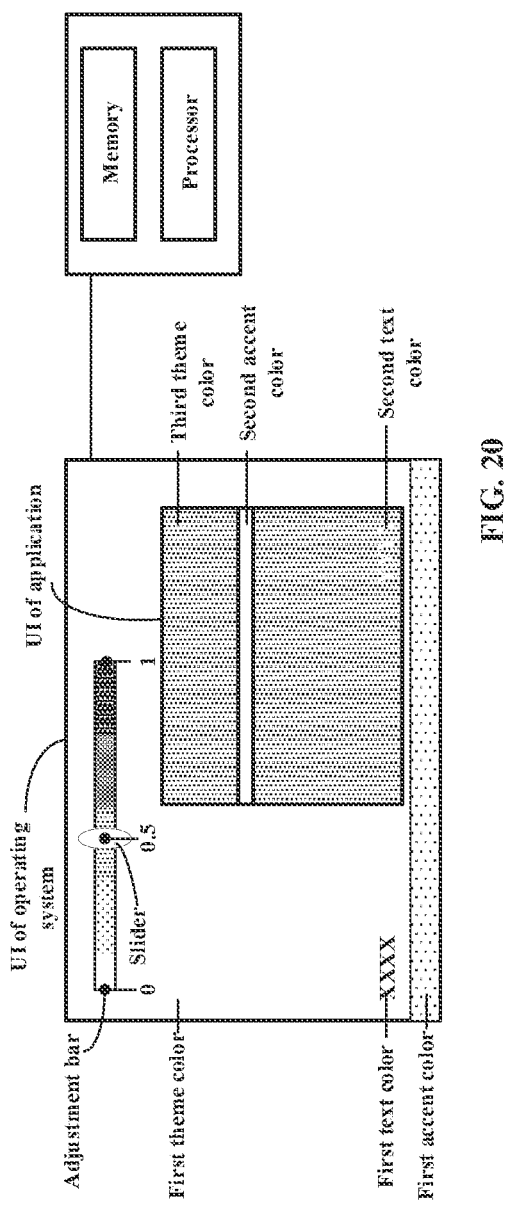
FIG. 20 is a schematic diagram of an apparatus in some embodiments according to the present disclosure.

FIG. 20 is a schematic diagram of an apparatus in some embodiments according to the present disclosure. Optionally, referring to FIG. 20, the memory stores computer-executable instructions for controlling the one or more processors to obtain a first value of a first color setting of an operating system; obtain a second value of a second color setting of an application on the operating system; and reset the second color setting of the application to a third color setting based on a combination of the first value and the second value. Optionally, the third color setting is different from the first color setting, and the third color setting is different from the second color setting.

Optionally, the third color setting is determined based on a bias factor, the first value, and the second value; and a value of the bias factor determines whether the third color setting is biased toward the first value or toward the second value.

Optionally, the memory stores computer-executable instructions for controlling the one or more processors to adjust the bias factor to bias a third value of the third color setting toward one of the first value and the second value.

Optionally, the memory stores computer-executable instructions for controlling the one or more processors to generate an adjustment bar on a user interface allowing a user to adjust the bias factor.

Optionally, the memory stores computer-executable instructions for controlling the one or more processors to generate a gradient color value array based on a combination of the first value; the second value; and a total number of sampling points in a color space containing points corresponding to the first value and the second value.

Optionally, in the process of generating the gradient color value array, the memory stores computer-executable instructions for controlling the one or more processors to determine the total number of sampling points in the color space containing points corresponding to the first value and the second value; determine a reference point dividing the color space into a first color space and a second color space, the reference point being between a first point corresponding to the first value and a second point corresponding to the second value; determine a first sampling interval with respect to a first sub-set of sampling points in the first color space and a second sampling interval with respect to a second sub-set of sampling points in the second color space; sample the first color space respectively at first type sampling points in the first sub-set of sampling points, adjacent first type sampling points spaced apart by the first sampling interval; sample the second color space respectively at second type sampling points in the second sub-set of sampling points, adjacent second type sampling points spaced apart by the second sampling interval; generate a first gradient color value sub-array including values respectively from the first type sampling points; and generate a second gradient color value sub-array including values respectively from the second type sampling points. Optionally, the gradient color value array including the first gradient color value sub-array and the second gradient color value sub-array.

Optionally, the bias factor has a value selected from a range between a first limit value and a second limit value. When the bias factor is adjusted closer to the first limit value than to the second limit value, the first sampling interval is smaller than the second sampling interval. When the bias factor is adjusted closer to the second limit value than to the first limit value, the first sampling interval is greater than the second sampling interval.

Optionally, the third color setting is determined based on a bias factor, the first value, and the second value. Optionally, the reference point corresponds to an n-th sampling point of N number of sampling points, wherein 0<n<N; N is the total number of sampling points, n is an integer closest to a value obtained by multiplying the bias factor by the total number of sampling points in the color space containing a first point corresponding to the first value and a second point corresponding to the second value.

Optionally, the first sampling interval is determined according to Equation (1):

$$I1=(V2-V1)*B/(N*(1-B)) \quad (1);$$

wherein I1 stands for the first sampling interval; V2 stands for the second value; V1 represents the first value; B stands for the bias factor; and N stands for the total number of sampling points.

Optionally, a value of an i-th sampling point within the first sub-set of sampling points is determined according to Equation (2):

$$Vi=V1+I1*i \quad (2);$$

wherein Vi stands for the value of the i-th sampling point among the N number of sampling points; V1 stands for the first value; i is an integer; and 0≤i<n.

Optionally, the second sampling interval is determined according to Equation (3):

$$I2=(V2-V1)*(1-B)/(N*B)) \quad (3);$$

wherein I2 represents the second sampling interval; V2 represents the second value; V1 represents the first value; B represents the bias factor; and N represents the total number of sampling points.

Optionally, a value of a j-th sampling point within the second sub-set of sampling points is determined according to Equation (4):

$$Vj=V1+I1*n+I2*(j-n) \quad (4);$$

wherein Vj stands for the value of the j-th sampling point among the N number of sampling points; V1 stands for the first value; I1 stands for the first sampling interval; I2 stands for the second sampling interval; j is an integer; and n≤j<N.

Optionally, the memory stores computer-executable instructions for controlling the one or more processors to separate the color space into a plurality of color channels. Optionally, in a respective color channel and in the process of generating the gradient color value array, the memory stores computer-executable instructions for controlling the one or more processors to determine the total number of sampling points in the respective color channel containing points corresponding to a first channel value and a second channel value, wherein the first channel value is a value of a color setting of an operating system with respect to the respective color channel, and the second channel value is a value of a default color setting of an application on the operating system with respect to the respective color channel; determine a reference point dividing the color space into a first color space and a second color space, the reference point being between a first point corresponding to the first channel value and a second point corresponding to the second channel value; determine a first sampling interval with respect to a first sub-set of sampling points in the first color space and a second sampling interval with respect to a second sub-set of sampling points in the second color space; sample the first color space respectively at first type sampling points in the first sub-set of sampling points, adjacent first type sampling points spaced apart by the first sampling interval; sample the second color space respectively at second type sampling points in the second sub-set of sampling points, adjacent second type sampling points spaced apart by the second sampling interval; generate a first gradient color value sub-array including values respectively from the first type sampling points; and generate a second gradient color value sub-array including values respectively from the second type sampling points. Optionally, the gradient color value array includes the first gradient color value sub-array and the second gradient color value sub-array.

Optionally, the memory stores computer-executable instructions for controlling the one or more processors to determine a third value of the third color setting by selecting a most representative color value in the gradient color value array.

Optionally, the memory stores computer-executable instructions for controlling the one or more processors to determine a third value of the third color setting by performing a median cut algorithm on the gradient color value array.

Optionally, in the process of performing the median cut algorithm on the gradient color value array, the memory stores computer-executable instructions for controlling the one or more processors to determine a smallest three-dimensional box within color space that contains all sampling points in the gradient color value array; and dividing the smallest three-dimensional box into a plurality of defined regions based on the median cut algorithm. Optionally, in the process of dividing the smallest three-dimensional box into the plurality of defined regions, the memory stores computer-executable instructions for controlling the one or more processors to sort the sampling points within the smallest three-dimensional box along a longest axis of the smallest three-dimensional box; divide the smallest three-dimensional box into two regions at a median of sorted sampling points; and apply sorting and dividing to the two regions until the smallest three-dimensional box has been divided into the plurality of defined regions.

Optionally, the memory stores computer-executable instructions for controlling the one or more processors to assign one of the plurality of defined regions as a selected defined region; and select a most representative color value in the selected defined region as a third value of the third color setting.

Optionally, the most representative color value is a color value of a most representative sampling point. Optionally, a sum of Euclidean distances between the most representative sampling point and other sampling points in the selected defined region is less than any of corresponding sums of Euclidean distances for the other sampling points.

Optionally, the memory stores computer-executable instructions for controlling the one or more processors to convert the gradient color value array into a first image having a color gradient, the first image having a dimension substantially same as a second image in the application on the operating system; and replace the second image in the application on the operating system with the first image.

Optionally, in the process of obtaining a first value of a first color setting of an operating system, the memory stores computer-executable instructions for controlling the one or more processors to detecting the operating system running on a dark mode; obtaining a default color setting stored on the operating system; and reducing at least one of saturation or lightness of the default color setting to obtain the first value.

Optionally, the first color setting includes one or more values selected from a group consisting of a value representing a first theme color of the operating system, a value representing a first accent color of the operating system, and a value representing a first text color of the operating system. Optionally, the second color setting includes one or more values selected from a group consisting of a value representing a second theme color of the application on the operating system, a value representing a second accent color, and a value representing a second text color. Optionally, the third color setting includes one or more values selected from a group consisting of a value representing a third theme color, a value representing a third accent color, and a value representing a third text color.

Optionally, the first value is a value representing a first theme color of the operating system; the second value is a value representing a second theme color of the application on the operating system; and the third value is a value representing a third theme color; and the third value is different from the first value, and the third value is different from the second value.

In another aspect, the present disclosure also provides a computer-program product including a non-transitory tangible computer-readable medium having computer-readable instructions thereon. Optionally, the computer-readable instructions being executable by a processor to cause the processor to perform obtaining a first value of a first color setting of an operating system; obtaining a second value of a second color setting of an application on the operating system; and resetting the second color setting of the application to a third color setting based on a combination of the first value and the second value. Optionally, the third color setting is different from the first color setting, and the third color setting is different from the second color setting.

Optionally, the third color setting is determined based on a bias factor, the first value, and the second value. Optionally, a value of the bias factor determines whether the third color setting is biased toward the first value or toward the second value.

Optionally, the computer-readable instructions being executable by a processor to cause the processor to perform adjusting the bias factor to bias a third value of the third color setting toward one of the first value and the second value.

Optionally, the computer-readable instructions being executable by a processor to cause the processor to perform generating an adjustment bar on a user interface allowing a user to adjust the bias factor.

Optionally, the computer-readable instructions being executable by a processor to cause the processor to perform generating a gradient color value array based on a combination of the first value; the second value; and a total number of sampling points in a color space containing points corresponding to the first value and the second value.

Optionally, in the process of generating the gradient color value array, the computer-readable instructions being executable by a processor to cause the processor to perform determining the total number of sampling points in the color space containing points corresponding to the first value and the second value; determining a reference point dividing the color space into a first color space and a second color space, the reference point being between a first point corresponding to the first value and a second point corresponding to the second value; determining a first sampling interval with respect to a first sub-set of sampling points in the first color space and a second sampling interval with respect to a second sub-set of sampling points in the second color space; sampling the first color space respectively at first type sampling points in the first sub-set of sampling points, adjacent first type sampling points spaced apart by the first sampling interval; sampling the second color space respectively at second type sampling points in the second sub-set of sampling points, adjacent second type sampling points spaced apart by the second sampling interval; generating a first gradient color value sub-array including values respectively from the first type sampling points; and generating a second gradient color value sub-array including values respectively from the second type sampling points. Optionally, the gradient color value array includes the first gradient color value sub-array and the second gradient color value sub-array.

Optionally, the bias factor has a value selected from a range between a first limit value and a second limit value. When the bias factor is adjusted closer to the first limit value than to the second limit value, the first sampling interval is smaller than the second sampling interval. When the bias factor is adjusted closer to the second limit value than to the first limit value, the first sampling interval is greater than the second sampling interval.

Optionally, the third color setting is determined based on a bias factor, the first value, and the second value; wherein the reference point corresponds to an n-th sampling point of N number of sampling points, wherein 0<n<N; N is the total number of sampling points, n is an integer closest to a value obtained by multiplying the bias factor by the total number of sampling points in the color space containing a first point corresponding to the first value and a second point corresponding to the second value.

Optionally, the first sampling interval is determined according to Equation (1):

$$I1=(V2-V1)*B/(N*(1-B)) \qquad (1);$$

wherein I1 stands for the first sampling interval; V2 stands for the second value; V1 represents the first value; B stands for the bias factor; and N stands for the total number of sampling points.

Optionally, a value of an i-th sampling point within the first sub-set of sampling points is determined according to Equation (2):

$$Vi=V1+I1*i \qquad (2);$$

wherein Vi stands for the value of the i-th sampling point among the N number of sampling points; V1 stands for the first value; i is an integer; and $0 \le i < n$;

Optionally, the second sampling interval is determined according to Equation (3):

$$I2=(V2-V1)*(1-B)/(N*B) \qquad (3);$$

wherein I2 represents the second sampling interval; V2 represents the second value; V1 represents the first value; B represents the bias factor; and N represents the total number of sampling points.

Optionally, a value of a j-th sampling point within the second sub-set of sampling points is determined according to Equation (4):

$$Vj=V1+I1*n+I2*(j-n) \qquad (4);$$

wherein Vj stands for the value of the j-th sampling point among the N number of sampling points; V1 stands for the first value; I1 stands for the first sampling interval; I2 stands for the second sampling interval; j is an integer; and $n \le j < N$.

Optionally, the computer-readable instructions being executable by a processor to cause the processor to perform separating the color space into a plurality of color channels.

Optionally, in a respective color channel and in the process of generating the gradient color value array, the computer-readable instructions being executable by a processor to cause the processor to perform determining the total number of sampling points in the respective color channel containing points corresponding to a first channel value and a second channel value, wherein the first channel value is a value of a color setting of an operating system with respect to the respective color channel, and the second channel value is a value of a default color setting of an application on the operating system with respect to the respective color channel; determining a reference point dividing the color space into a first color space and a second color space, the reference point being between a first point corresponding to the first channel value and a second point corresponding to the second channel value; determining a first sampling interval with respect to a first sub-set of sampling points in the first color space and a second sampling interval with respect to a second sub-set of sampling points in the second color space; sampling the first color space respectively at first type sampling points in the first sub-set of sampling points, adjacent first type sampling points spaced apart by the first sampling interval; sampling the second color space respectively at second type sampling points in the second sub-set of sampling points, adjacent second type sampling points spaced apart by the second sampling interval; generating a first gradient color value sub-array including values respectively from the first type sampling points; and generating a second gradient color value sub-array including values respectively from the second type sampling points. Optionally, the gradient color value array includes the first gradient color value sub-array and the second gradient color value sub-array.

Optionally, the computer-readable instructions being executable by a processor to cause the processor to perform determining a third value of the third color setting by selecting a most representative color value in the gradient color value array.

Optionally, the computer-readable instructions being executable by a processor to cause the processor to perform determining a third value of the third color setting by performing a median cut algorithm on the gradient color value array.

Optionally, in the process of performing the median cut algorithm on the gradient color value array, the computer-readable instructions being executable by a processor to cause the processor to perform determining a smallest three-dimensional box within color space that contains all sampling points in the gradient color value array; and dividing the smallest three-dimensional box into a plurality of defined regions based on the median cut algorithm. Optionally, in the process of dividing the smallest three-dimensional box into the plurality of defined regions, the computer-readable instructions being executable by a processor to cause the processor to perform sorting the sampling points within the smallest three-dimensional box along a longest axis of the smallest three-dimensional box; dividing the smallest three-dimensional box into two regions at a median of sorted sampling points; and applying sorting and dividing to the two regions until the smallest three-dimensional box has been divided into the plurality of defined regions.

Optionally, the computer-readable instructions being executable by a processor to cause the processor to perform assigning one of the plurality of defined regions as a selected defined region; and selecting a most representative color value in the selected defined region as a third value of the third color setting.

Optionally, the most representative color value is a color value of a most representative sampling point. Optionally, a sum of Euclidean distances between the most representative sampling point and other sampling points in the selected defined region is less than any of corresponding sums of Euclidean distances for the other sampling points.

Optionally, the computer-readable instructions being executable by a processor to cause the processor to perform converting the gradient color value array into a first image having a color gradient, the first image having a dimension substantially same as a second image in the application on the operating system; and replacing the second image in the application on the operating system with the first image.

Optionally, in the process of obtaining a first value of a first color setting of an operating system, the computer-readable instructions being executable by a processor to cause the processor to perform detecting the operating system running on a dark mode; obtaining a default color setting stored on the operating system; and reducing at least one of saturation or lightness of the default color setting to obtain the first value.

Optionally, the first color setting includes one or more values selected from a group consisting of a value representing a first theme color of the operating system, a value representing a first accent color of the operating system, and a value representing a first text color of the operating system. Optionally, the second color setting includes one or more values selected from a group consisting of a value representing a second theme color of the application on the operating system, a value representing a second accent color, and a value representing a second text color. Optionally, the third color setting includes one or more values selected from a group consisting of a value representing a third theme color, a value representing a third accent color, and a value representing a third text color.

Optionally, the first value is a value representing a first theme color of the operating system. Optionally, the second value is a value representing a second theme color of the application on the operating system. Optionally, the third value is a value representing a third theme color. Optionally, the third value is different from the first value, and the third value is different from the second value.

Various illustrative operations described in connection with the configurations disclosed herein may be implemented as electronic hardware, computer software, or combinations of both. Such operations may be implemented or performed with a general purpose processor, a digital signal processor (DSP), an ASIC or ASSP, an FPGA or other programmable logic device, discrete gate or transistor logic, discrete hardware components, or any combination thereof designed to produce the configuration as disclosed herein. For example, such a configuration may be implemented at least in pan as a hard-wired circuit, as a circuit configuration fabricated into an application-specific integrated circuit, or as a firmware program loaded into non-volatile storage or a software program loaded from or into a data storage medium as machine-readable code, such code being instructions executable by an array of logic elements such as a general purpose processor or other digital signal processing unit. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. A software module may reside in a non-transitory storage medium such as RAM (random-access memory), ROM (read-only memory), nonvolatile RAM (NVRAM) such as flash RAM, erasable programmable ROM (EPROM), electrically erasable programmable ROM (EEPROM), registers, hard disk, a removable disk, or a CD-ROM; or in any other form of storage medium known in the art. An illustrative storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A computer-implemented method, the method comprising:
    obtaining a first value of a first color setting of an operating system;
    obtaining a second value of a second color setting of an application on the operating system;
    resetting the second color setting of the application to a third color setting based on a combination of the first value and the second value; and
    generating a gradient color value array based on a combination of the first value;
    the second value; and a total number of sampling points in a color space containing points corresponding to the first value and the second value;
    wherein the third color setting is different from the first color setting, and the third color setting is different from the second color setting.

2. The computer-implemented method of claim 1, wherein the third color setting is determined based on a bias factor, the first value, and the second value; and a value of the bias factor determines whether the third color setting is biased toward the first value or toward the second value.

3. The computer-implemented method of claim 2, the computer-implemented method further comprising adjusting the bias factor to bias a third value of the third color setting toward one of the first value and the second value.

4. The computer-implemented method of claim 3, the computer-implemented method further comprising generating an adjustment bar on a user interface allowing a user to adjust the bias factor.

5. The computer-implemented method of claim 1, wherein generating the gradient color value array comprises:
    determining the total number of sampling points in the color space containing points corresponding to the first value and the second value;
    determining a reference point dividing the color space into a first color space and a second color space, the reference point being between a first point corresponding to the first value and a second point corresponding to the second value;

determining a first sampling interval with respect to a first sub-set of sampling points in the first color space and a second sampling interval with respect to a second sub-set of sampling points in the second color space;

sampling the first color space respectively at first type sampling points in the first sub-set of sampling points, adjacent first type sampling points spaced apart by the first sampling interval;

sampling the second color space respectively at second type sampling points in the second sub-set of sampling points, adjacent first type sampling points spaced apart by the second sampling interval;

generating a first gradient color value sub-array comprising values respectively from the first type sampling points; and generating a second gradient color value sub-array comprising values respectively from the second type sampling points;

wherein the gradient color value array comprises the first gradient color value sub-array and the second gradient color value sub-array.

6. The computer-implemented method of claim 5, wherein a bias factor has a value selected from a range between a first limit value and a second limit value;

wherein, when the bias factor is adjusted closer to the first limit value than to the second limit value, the first sampling interval is smaller than the second sampling interval; and when the bias factor is adjusted closer to the second limit value than to the first limit value, the first sampling interval is greater than the second sampling interval.

7. The computer-implemented method of claim 6, wherein the third color setting is determined based on the bias factor, the first value, and the second value; and wherein the reference point corresponds to an n-th sampling point of N number of sampling points, and wherein 0<n<N; N is the total number of sampling points, n is an integer closest to a value obtained by multiplying the bias factor by the total number of sampling points in the color space containing a first point corresponding to the first value and a second point corresponding to the second value.

8. The computer-implemented method of claim 7, wherein the first sampling interval is determined according to Equation (1):

$$I1=(V2-V1)*B/(N*(1-B)) \quad (1);$$

wherein I1 stands for the first sampling interval; V2 stands for the second value; V1 represents the first value; B stands for the bias factor; and N stands for the total number of sampling points;

a value of an i-th sampling point within the first sub-set of sampling points is determined according to Equation (2):

$$Vi=V1+I1*i \quad (2);$$

wherein Vi stands for the value of the i-th sampling point among the N number of sampling points; V1 stands for the first value; i is an integer; and $0 \le i < n$;

the second sampling interval is determined according to Equation (3):

$$I2=(V2-V1)*(1-B)/(N*B) \quad (3);$$

wherein I2 represents the second sampling interval; V2 represents the second value; V1 represents the second value; B represents the bias factor; and N represents the total number of sampling points; and a value of a j-th sampling point within the second sub-set of sampling points is determined according to Equation (4):

$$Vj=V1+I1*n+I2*(j-n) \quad (4);$$

wherein Vj stands for the value of the j-th sampling point among the N number of sampling points; V1 stands for the first value; I1 stands for the first sampling interval; I2 stands for the second sampling interval; j is an integer; and $n \le j < N$.

9. The computer-implemented method of claim 1, the computer-implemented method further comprising separating the color space into a plurality of color channels;

wherein, in a respective color channel, generating the gradient color value array comprises:

determining the total number of sampling points in the respective color channel containing points corresponding to a first channel value and a second channel value, wherein the first channel value is a value of a color setting of an operating system with respect to the respective color channel, and the second channel value is a value of a default color setting of an application on the operating system with respect to the respective color channel;

determining a reference point dividing the color space into a first color space and a second color space, the reference point being between a first point corresponding to the first channel value and a second point corresponding to the second channel value;

determining a first sampling interval with respect to a first sub-set of sampling points in the first color space and a second sampling interval with respect to a second sub-set of sampling points in the second color space;

sampling the first color space respectively at first type sampling points in the first sub-set of sampling points, adjacent first type sampling points spaced apart by the first sampling interval;

sampling the second color space respectively at second type sampling points in the second sub-set of sampling points, adjacent first type sampling points spaced apart by the second sampling interval;

generating a first gradient color value sub-array comprising values respectively from the first type sampling points; and generating a second gradient color value sub-array comprising values respectively from the second type sampling points;

wherein the gradient color value array comprises the first gradient color value sub-array and the second gradient color value sub-array.

10. The computer-implemented method of claim 1, the computer-implemented method further comprising determining a third value of the third color setting by selecting a most representative color value in the gradient color value array.

11. The computer-implemented method of claim 1, the computer-implemented method further comprising determining a third value of the third color setting by performing a median cut algorithm on the gradient color value array.

12. The computer-implemented method of claim 11, wherein performing the median cut algorithm on the gradient color value array comprises:

determining a smallest three-dimensional box within color space that contains all sampling points in the gradient color value array; and dividing the smallest three-dimensional box into a plurality of defined regions based on the median cut algorithm;

wherein dividing the smallest three-dimensional box into the plurality of defined regions comprises:

sorting the sampling points within the smallest three-dimensional box along a longest axis of the smallest three-dimensional box;

dividing the smallest three-dimensional box into two regions at a median of sorted sampling points; and applying sorting and dividing to the two regions until the smallest three-dimensional box has been divided into the plurality of defined regions.

13. The computer-implemented method of claim 12, the computer-implemented method further comprising:

assigning one of the plurality of defined regions as a selected defined region; and selecting a most representative color value in the selected defined region as a third value of the third color setting.

14. The computer-implemented method of claim 13, wherein the most representative color value is a color value of a most representative sampling point; and a sum of Euclidean distances between the most representative sampling point and other sampling points in the selected defined region is less than any of corresponding sums of Euclidean distances for the other sampling points.

15. The computer-implemented method of claim 1, the computer-implemented method further comprising:

converting the gradient color value array into a first image having a color gradient, the first image having a dimension substantially same as a second image in the application on the operating system; and replacing the second image in the application on the operating system with the first image.

16. The computer-implemented method of claim 1, wherein obtaining a first value of a first color setting of an operating system comprises:

detecting that the operating system is running in a dark mode;

obtaining a default color setting stored on the operating system; and reducing at least one of saturation or lightness of the default color setting to obtain the first value.

17. The computer-implemented method of claim 1, wherein the first color setting comprises one or more values selected from a group consisting of a value representing a first theme color of the operating system, a value representing a first accent color of the operating system, and a value representing a first text color of the operating system;

the second color setting comprises one or more values selected from a group consisting of a second theme color of the application on the operating system, a second accent color, and a value representing a second text color; and the third color setting comprises one or more values selected from a group consisting of a value representing a third theme color, a value representing a third accent color, and a value representing a third text color.

18. An apparatus, comprising:

a memory;

one or more processors;

wherein the memory and the one or more processors are connected with each other; and the memory stores computer-executable instructions for controlling the one or more processors to:

obtain a first value of a first color setting of an operating system;

obtain a second value of a second color setting of an application on the operating system;

reset the second color setting of the application to a third color setting based on a combination of the first value and the second value; and generate a gradient color value array based on a combination of the first value; the second value; and a total number of sampling points in a color space containing points corresponding to the first value and the second value;

wherein the third color setting is different from the first color setting, and the third color setting is different from the second color setting.

19. A computer-program product comprising a non-transitory tangible computer-readable medium having computer-readable instructions thereon, the computer-readable instructions being executable by a processor to cause the processor to perform:

obtaining a first value of a first color setting of an operating system;

obtaining a second value of a second color setting of an application on the operating system;

resetting the second color setting of the application to a third color setting based on a combination of the first value and the second value; and generating a gradient color value array based on a combination of the first value;

the second value; and a total number of sampling points in a color space containing points corresponding to the first value and the second value;

wherein the third color setting is different from the first color setting, and the third color setting is different from the second color setting.

\* \* \* \* \*